US009232182B2

(12) United States Patent
Maeda

(10) Patent No.: US 9,232,182 B2
(45) Date of Patent: Jan. 5, 2016

(54) APPARATUS, SYSTEM, AND METHOD OF MANAGING DATA TRANSMISSION, AND RECORDING MEDIUM STORING TRANSMISSION MANAGEMENT PROGRAM

(71) Applicant: Kaoru Maeda, Kanagawa (JP)

(72) Inventor: Kaoru Maeda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 385 days.

(21) Appl. No.: 13/866,317

(22) Filed: Apr. 19, 2013

(65) Prior Publication Data

US 2013/0286155 A1     Oct. 31, 2013

(30) Foreign Application Priority Data

Apr. 25, 2012   (JP) ................. 2012-099611

(51) Int. Cl.
*H04N 7/15* (2006.01)
*H04L 29/08* (2006.01)

(52) U.S. Cl.
CPC . *H04N 7/15* (2013.01); *H04L 67/14* (2013.01)

(58) Field of Classification Search
None
See application file for complete search history.

(56) References Cited

U.S. PATENT DOCUMENTS

| 5,323,445 | A | 6/1994 | Nakatsuka |
| 2002/0159394 | A1 | 10/2002 | Decker et al. |
| 2005/0047336 | A1 | 3/2005 | Decker et al. |
| 2008/0069012 | A1 | 3/2008 | Decker et al. |
| 2008/0098067 | A1* | 4/2008 | O'Sullivan et al. ........... 709/204 |
| 2008/0112337 | A1 | 5/2008 | Shaffer et al. |
| 2008/0207173 | A1* | 8/2008 | Jendbro .................. 455/412.1 |
| 2009/0190736 | A1 | 7/2009 | Bertin et al. |
| 2011/0055227 | A1 | 3/2011 | Igarashi |
| 2011/0141950 | A1 | 6/2011 | Patil |
| 2011/0219060 | A1* | 9/2011 | Ohwada ........................ 709/203 |
| 2012/0314019 | A1 | 12/2012 | Asai |
| 2013/0117373 | A1 | 5/2013 | Umehara |
| 2013/0223342 | A1* | 8/2013 | Kim .............................. 370/328 |

FOREIGN PATENT DOCUMENTS

| EP | 0 502 547 A2 | 9/1992 |
| EP | 2 083 547 A1 | 7/2009 |
| JP | 2002-314965 A | 10/2002 |
| JP | 2005-109922 A | 4/2005 |
| JP | 2011-199845 A | 10/2011 |
| JP | 2012-050063 A | 3/2012 |
| JP | 2012-147416 A | 8/2012 |
| WO | WO 2011/105621 A1 | 9/2011 |

OTHER PUBLICATIONS

U.S. Appl. No. 13/777,389, filed Feb. 26, 2013, Maeda, et al.
U.S. Appl. No. 13/903,449, filed May 28, 2013, Maeda, et al.
U.S. Appl. No. 13/903,131, filed May 28, 2013, Maeda, et al.
Extended European Search Report issued Jun. 6, 2014 in Patent Application No. 13164382.7.

* cited by examiner

*Primary Examiner* — Fan Tsang
*Assistant Examiner* — Jeffrey Lytle
(74) *Attorney, Agent, or Firm* — Oblon, McClelland, Maier & Neustadt, L.L.P.

(57) ABSTRACT

The reservation communication information is generated based on terminal identification information for identifying a transmission terminal that is currently participating in a session based on reservation of communication, which at least indicates whether a counterpart transmission terminal that is scheduled to participate in the session based on the reservation of communication is currently participating in the session based on the reservation of communication. The reservation communication information may be output for display at a request transmission terminal that may request to start communication with the counterpart transmission terminal based on the reservation of communication.

13 Claims, 19 Drawing Sheets

FIG. 8

RELAY DEVICE
MANAGEMENT TABLE

| RELAY DEVICE ID | IP ADDRESS |
|---|---|
| 111a | 1.2.1.2 |
| 111b | 1.2.2.2 |
| 111c | 1.3.1.2 |
| 111d | 1.3.2.2 |

FIG. 9

TERMINAL AUTHENTICATION
MANAGEMENT TABLE

| TERMINAL ID | PASSWORD |
|---|---|
| 01aa | aaaa |
| 01ab | abab |
| 01ba | baba |
| ... | ... |

FIG. 10

TERMINAL MANAGEMENT TABLE

| TERMINAL ID | TERMINAL NAME | OPERATION STATE | TERMINAL IP ADDRESS |
|---|---|---|---|
| 01aa | JAPAN TOKYO OFFICE AA TERMINAL | ONLINE | 1.2.1.3 |
| 01ab | JAPAN TOKYO OFFICE AB TERMINAL | COMMUNICATING | 1.2.1.4 |
| ... | ... | ... | ... |
| 01ba | JAPAN OSAKA OFFICE BA TERMINAL | COMMUNICATING | 1.2.2.3 |
| 01bb | JAPAN OSAKA OFFICE BB TERMINAL | ONLINE | 1.2.2.4 |
| ... | ... | ... | ... |
| 01ca | U.S. NY OFFICE CA TERMINAL | OFFLINE | 1.3.1.3 |
| 01cb | U.S. NY OFFICE CB TERMINAL | ONLINE | 1.3.1.4 |
| ... | ... | ... | ... |
| 01da | U.S. WASH, D.C. OFFICE DA TERMINAL | COMMUNICATING | 1.3.2.3 |
| 01db | U.S. WASH, D.C. OFFICE DB TERMINAL | COMMUNICATING | 1.3.2.4 |
| ... | ... | ... | ... |

FIG. 11

CANDIDATE LIST MANAGEMENT TABLE

| REQUEST TERMINAL ID | COUNTERPART TERMINAL ID |
|---|---|
| 01aa | 01ab,01ba,01bb,01ca,01cb,01da,01db |
| 01ab | 01aa,01ca,01cb,01cc |
| 01ba | 01aa,01ab,01ca,01cb,01da,01db |
| ... | ... |
| 01db | 01aa,01ab,01ba,⋯,01da,01ca,01cb,⋯,01da |
| ... | ... |

FIG. 12

SESSION MANAGEMENT TABLE

| SESSION ID | RESERVATION ID | RELAY DEVICE ID | TERMINAL ID |
|---|---|---|---|
| se01 | rsv02 | 111a | 01aa, 01db |
| se02 | rsv06 | 111b | 01bd |
| se03 | rsv08 | 111c | 01ae, 01dc |
| ... | ... | ... | ... |

FIG. 13

RESERVATION MANAGEMENT TABLE

| RESERVATION ID | START DATE/TIME | END DATE/TIME | CONFERENCE NAME | TERMINAL ID |
|---|---|---|---|---|
| rsv01 | 2011/11/10 08:30 | 2011.11.10 10:00 | New York Branch Liaison | 01ad, 01cc |
| rsv02 | 2011/11/10 13:30 | 2011.11.10 14:50 | STRATEGY MEETING | 01aa, 01ab, 01db |
| rsv03 | 2011/11/10 15:00 | 2011.11.10 17:00 | SECURITY | 01ca, 01db |
| rsv04 | 2011/11/10 09:00 | 2011.11.10 10:00 | PRODUCT PLANNING | 01ba, 01ca |
| rsv05 | 2011/11/11 12:00 | 2011.11.17 13:00 | PERFORMANCE REPORT | 01aa, 01ba, 01ca |
| ... | ... | ... | ... | ... |

FIG. 15

REGISTER SCHEDULE        JAPAN TOKYO OFFICE AA TERMINAL  LOGOUT

DATE  2011/11/10

TIME  13:30  -  14:50

NAME  STRATEGY MEETING

PARTICIPANTS  JAPAN TOKYO OFFICE AA TERMINAL
              JAPAN TOKYO OFFICE AB TERMINAL
              U.S. WASH, D.C. OFFICE DB TERMINAL
     SELECT

STORE   CANCEL

SELECT TERMINAL
☒ JAPAN TOKYO OFFICE AA TERMINAL
☒ JAPAN TOKYO OFFICE AB TERMINAL
☐ JAPAN OSAKA OFFICE BA TERMINAL
☐ JAPAN OSAKA OFFICE BB TERMINAL
☐ U.S. NEW YORK OFFICE CA TERMINAL
☐ U.S. NEW YORK OFFICE CB TERMINAL
☐ U.S. WASH, D.C. OFFICE DA TERMINAL
☒ U.S. WASH, D.C. OFFICE DB TERMINAL

OK   CANCEL

FIG. 18

CONFERENCE DATA

| RESERVATION ID | START DATE/ TIME | END DATE/ TIME | CONFERENCE NAME | TERMINAL ID | OPERATION STATE | TERMINAL NAME |
|---|---|---|---|---|---|---|
| rsv02 | 13:30 | 14:50 | STRATEGY MEETING | 01ab | MEETING | JAPAN TOKYO OFFICE AB TERMINAL |
| | | | | 01db | MEETING | U.S. WASH, D.C. OFFICE DB TERMINAL |

APPARATUS, SYSTEM, AND METHOD OF MANAGING DATA TRANSMISSION, AND RECORDING MEDIUM STORING TRANSMISSION MANAGEMENT PROGRAM

CROSS-REFERENCE TO RELATED APPLICATIONS

This patent application is based on and claims priority pursuant to 35 U.S.C. §119 to Japanese Patent Application No. 2012-099611, filed on Apr. 25, 2012, in the Japan Patent Office, the entire disclosure of which is hereby incorporated by reference herein.

BACKGROUND

1. Field of the Invention

The present invention generally relates to an apparatus, system, and method of generating information regarding communication based on reservation, for output to a transmission terminal that is scheduled to start communication based on the reservation, and a reservation communication information generating program stored in a non-transitory recording medium.

2. Description of the Related Art

With the need for reducing costs or times associated with business trips, more companies are moving towards data transmission systems provided with teleconference or videoconference ("conference") capabilities. The transmission systems allow transmission of contents data such as image data and/or sound data among a plurality of transmission terminals that are remotely located from one another to facilitate communication among the plurality of transmission terminals through a communication network.

When communication is managed using a management server, for example, as described in Japanese Patent Application Publication No. 2005-109922-A (Registration No. 4292544), the user cannot freely change the time to start or end, as the management server manages communication based on the scheduled information. While the management server can allow the user to freely change the time to start or end the conference without requiring the user to change the scheduled information, for example, as described in Japanese Patent Application Publication No. 2011-199845-A, the management system may not be able to manage communication based on the scheduled information, as communication may not be based on the scheduled information.

SUMMARY

According to one aspect of the present invention, a transmission management apparatus or system generates reservation communication information based on terminal identification information for identifying a transmission terminal that is currently participating in a session based on reservation of communication, which at least indicates whether a counterpart transmission terminal that is scheduled to participate in the session based on the reservation of communication is currently participating in the session based on the reservation of communication. The reservation communication information may be transmitted to a request transmission terminal that may request to start communication with the counterpart transmission terminal based on the reservation of communication.

According to another aspect of the present invention, a request transmission terminal transmits a request for obtaining reservation communication information regarding a session based on reservation communication. The request causes a transmission management apparatus or system to generate reservation communication information, which at least indicates whether a counterpart transmission terminal that is scheduled to participate in the session based on the reservation of communication is currently participating in the session based on the reservation of communication.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 8 is an example data structure of a relay device management table, managed by the management system of FIG. 6;

FIG. 9 is an example data structure of a terminal authentication management table, managed by the management system of FIG. 6;

FIG. 10 is an example data structure of a terminal management table, managed by the management system of FIG. 6;

FIG. 11 is an example data structure of a candidate list management table, managed by the management system of FIG. 6;

FIG. 12 is an example data structure of a session management table, managed by the management system of FIG. 6;

FIG. 13 is an example data structure of a registration management table, managed by the management system of FIG. 6;

FIG. 15 is an illustration of a reservation registration screen, displayed at the terminal of FIG. 3;

FIG. 18 is an example data structure of conference data;

Figure 1:
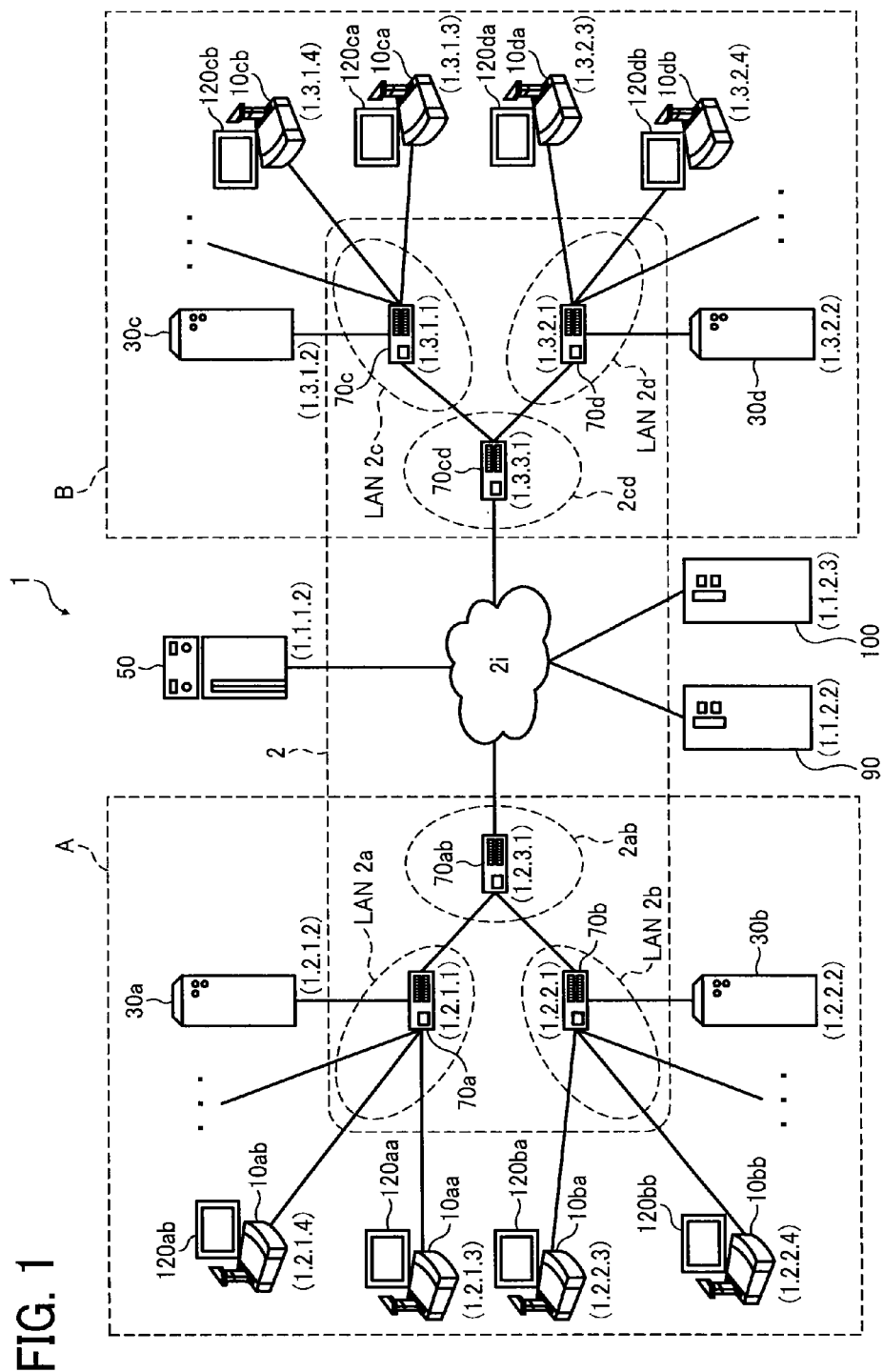
FIG. 1 is a schematic block diagram illustrating a configuration of a transmission system, according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like. These terms in general may be referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Figure 2:
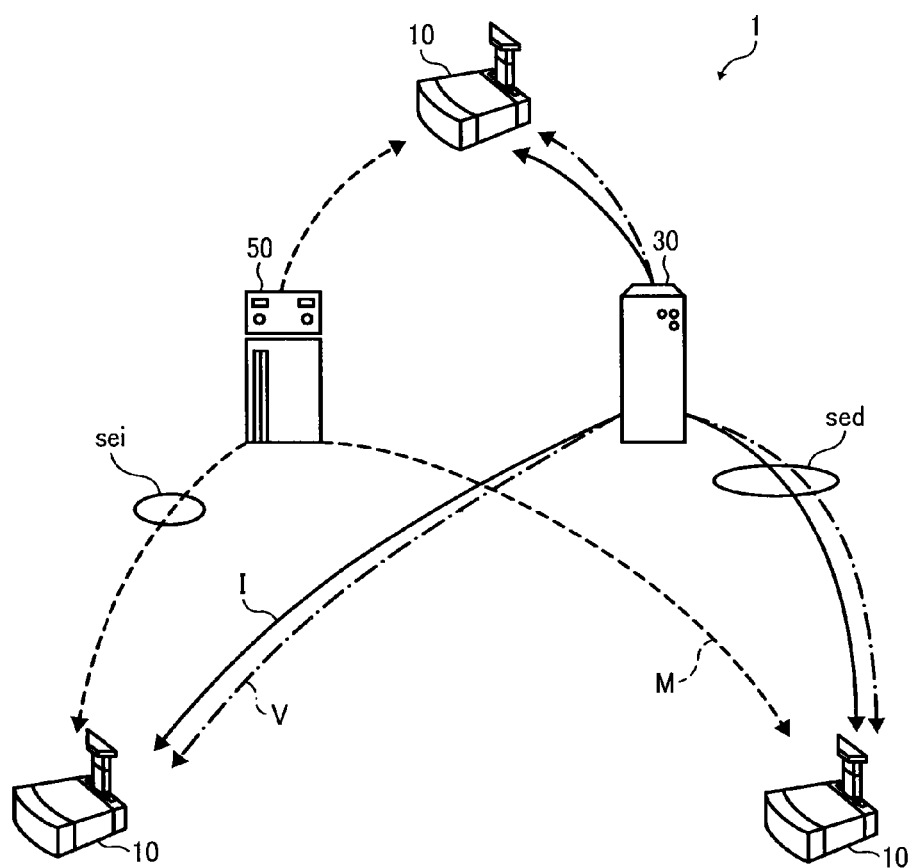
FIG. 2 is an illustration for explaining transmission or reception of data such as image data, sound data, or management data, performed by the transmission system of FIG. 1.

FIG. 1 is a schematic block diagram illustrating a transmission system, according to an example embodiment of the present invention. FIG. 2 is an illustration for explaining transmission or reception of data such as image data, sound data, or management data, performed by the transmission system of FIG. 1.

In one example, the transmission system 1 functions as a data providing system that transmits contents data from one transmission terminal to another transmission terminal in one direction through a transmission management system 50. In another example, the transmission system 1 functions as a two-way communication system that exchanges various information including image data and/or sound data between or among two or more of a plurality of transmission terminals 10 each of which functions as a communication terminal, through the transmission management system 50 that functions as a communication management system. When functioning as the communication system, the transmission system 1 may be implemented as a videoconference system, video teleconference system, voice conference system, voice teleconference system, or personal computer screen sharing system.

In the following examples, it is assumed that the transmission system 1 of FIG. 1 is implemented as the videoconference system, which is one example structure of the communication system. Based on this assumption, the transmission management system 50 is implemented as the videoconference communication management system, which is one example structure of the communication management system. Further, the transmission terminal 10 is implemented as the videoconference communication terminal, which is one example structure of the communication terminal. However, the use of transmission system 1 is not limited to the following examples such that the transmission system 1 may be implemented as the transmission system or the communication system as described above.

The transmission system 1 of FIG. 1 includes a plurality of transmission terminals 10*aa*, 10*ab*, 10*ba*, 10*bb*, 10*ca*, 10*cb*, 10*da*, and 10*db*, and a plurality of displays 120*aa*, 120*ab*, 120*ba*, 120*bb*, 120*ca*, 120*cb*, 120*da*, and 120*db*, a plurality of relay devices 30*a*, 30*b*, 30*c*, and 30*d*, a transmission management system 50, a program providing system 90, and a maintenance system 100.

The transmission terminal 10 transmits or receives contents data such as image data and/or sound data to or from another transmission terminal 10. In this example, it is assumed that a moving image is transmitted as the image data. Alternatively, a still image, or both of the still image and the moving image, may be transmitted as the image data.

For the descriptive purposes, in this example, any number of the plurality of terminals 10*aa* to 10*db* may be collectively or each referred to as the terminal 10. Any number of the plurality of displays 120*aa* to 120*db* may be collectively or each referred to as the display 120. Any number of the plurality of relay devices 30*a*, 30*b*, 30*c*, and 30*d* may be collectively or each referred to as the relay device 30. The transmission management system 50 may be referred to as the "management system" 50.

The terminal 10 that transmits data to another terminal 10 to carry out videoconference may be referred to as the request terminal 10. The terminal 10 that receives data from another terminal 10 to carry out videoconference may be referred to as the counterpart terminal 10. For example, the request terminal 10 includes any terminal 10 that requests another terminal 10 to start videoconference, and the counterpart terminal 10 includes any terminal 10 that is associated with the request terminal 10 to start videoconference.

As illustrated in FIG. 2, in the transmission system 1, the terminals 10 each establish a management data session "sei" with the management system 50 to start transmission and reception of various types of management data "M" with the management system 50. Further, in this example, the terminals 10 each establish contents data sessions "sed" with the relay device 30 to transmit or receive contents data with the relay device 30. The contents data sessions include at least one session "I" to transmit image data, and a session "V" to transmit sound data such as voice data. In this example, the contents data session may be referred to as the image and/or sound data session.

Referring back to FIG. 1, the terminal 10 transmits or receives contents data such as image data and sound data to or from a counterpart terminal 10 to establish communication with the counterpart terminal 10. As described below, the terminal 10 transmits or receives image data in addition to sound data. Alternatively, the terminal 10 may transmit or receive only sound data. The relay device 30 relays contents data such as image data or sound data between or among the terminals 10. For example, the relay device 30 may be implemented by a router or any device that provides the function of router. The management system 50 centrally manages various information regarding the terminal 10 or the relay device 30.

The plurality of routers 70a to 70d, 70ab, and 70cd, which may be collectively or each referred to as the router 70, selects a route that is most suitable for transmitting contents data such as image data and sound data.

The program providing system 90 includes a hard disk device (HD) 204 (FIG. 5), which stores a terminal control program that causes the terminal 10 to perform various functions or operations. For example, the program providing system 90 sends the terminal control program to the terminal 10 through the Internet 2i to cause the terminal 10 to install the terminal control program. Further, the HD 204 of the program providing system 90 may store a relay control program that causes the relay device 30 to perform various functions or operations. For example, the program providing system 90 sends the relay control program to the relay device 30 through the Internet 2i to cause the relay device 30 to install the relay control program. Further, the HD 204 of the program providing system 90 may store a transmission management program that causes the management system 50 to perform various functions or operations. For example, the program providing system 90 sends the transmission management program to the management system 50 to cause the management system 50 to install the transmission management program.

The maintenance system 100 is implemented as one or more computers capable of maintaining, managing, fixing, or upgrading at least one of the terminal 10, relay device 30, management system 50, and program providing system 90. Assuming that the maintenance system 100 is provided within a country, and the terminal 10, relay device 30, management system 50, and program providing system 90 are each installed outside the country, the maintenance system 100 maintains, manages, fixes, or upgrades at least one of the terminal 10, relay device 30, management system 50, and program providing system 90, remotely through the communication network 2. The maintenance system 100 may manage maintenance of at least one of the terminal 10, relay device 30, management system 50, and program providing system 90 without using the communication network 2. For example, a machine type number, a manufacturing number, customer information, maintenance and repair information, and failure log information may be maintained at the maintenance system 100 without using the communication network 2.

Still referring to FIG. 1, the terminals 10aa and 10ab, the relay device 30a, and the router 70a are connected to a local area network (LAN) 2a. The terminals 10ba and 10bb, the relay device 30b, and the router 70b are connected to a LAN 2b. The LAN 2a and the LAN 2b are connected to a leased line 2ab in which the router 70ab is provided. It is assumed that these devices including the terminals 10aa to 10bb are located in an area A. For example, assuming that the area is any area in Japan, the LAN 2a could be located within an office in a city such as Tokyo, and the LAN 2b could be located within an office in another city such as Osaka.

The terminals 10ca and 10cb, the relay device 30c, and the router 70c are connected to a LAN 2c. The terminals 10da and 10db, the relay device 30d, and the router 70d are connected to a LAN 2d. The LAN 2c and the LAN 2d are connected to a leased line 2cd in which the router 70cd is provided. It is assumed that these devices including the terminals 10ca to 10db are located in an area B apart from the area A. For example, assuming that the area is any area in the United States, the LAN 2c could be located within an office in a city such as New York, and the LAN 2d could be located within an office in another city such as Washington, D.C. The area A and the area B are connected through the Internet 2i, via the routers 70ab and 70cd.

The management system 50 and the program providing system 90 are connected through the Internet 2i to the terminal 10 and the relay device 30. Any one of the management system 50 and the program providing system 90 may be located at any location within or outside any one of the area A and the area B.

In this example, the communication network 2 includes the LAN 2a, LAN 2b, leased line 2ab, Internet 2i, leased line 2cd, LAN 2c, and LAN 2d. Any one or any portion of these lines or any other lines that may be included in the communication network 2 may be implemented as wired network or wireless network such as Wireless Fidelity (WiFi) network or Bluetooth (Registered Trademark) network.

As shown in FIG. 1, the terminal 10, the relay device 30, the management system 50, the router 70, the program providing system 90, and the maintenance system 100 are each provided with four digit numbers. These four digit numbers separated by dots are the simple expressions of IP addresses respectively assigned to any one of the devices shown in FIG. 1, each of which has a function of communication device. For example, the IP address of the terminal 10aa is "1.2.1.3". For simplicity, it is assumed that the IP address is expressed in IPv4. Alternatively, the IP address may be expressed in IPv6.

Further, in this example, the terminal 10 may be communicated in various ways. For example, at least two different terminals 10 that are located at different rooms in the same office, or at least two different terminals 10 that are located at different offices that are remotely located from one another, may communicate with one another. In another example, at least two different terminals 10 that are located in the same room may communicate with one another. In another example, one terminal 10 that is located indoor and another terminal 10 that is located outdoor, or at least two different terminals 10 that are both located outdoor, may communicate with one another. When the terminal 10 is located outdoor, the terminal 10 communicates with the other terminal 10 through a wireless network such as a wireless network designed for a mobile phone.

<Hardware Structure of Transmission System>

Figure 3:
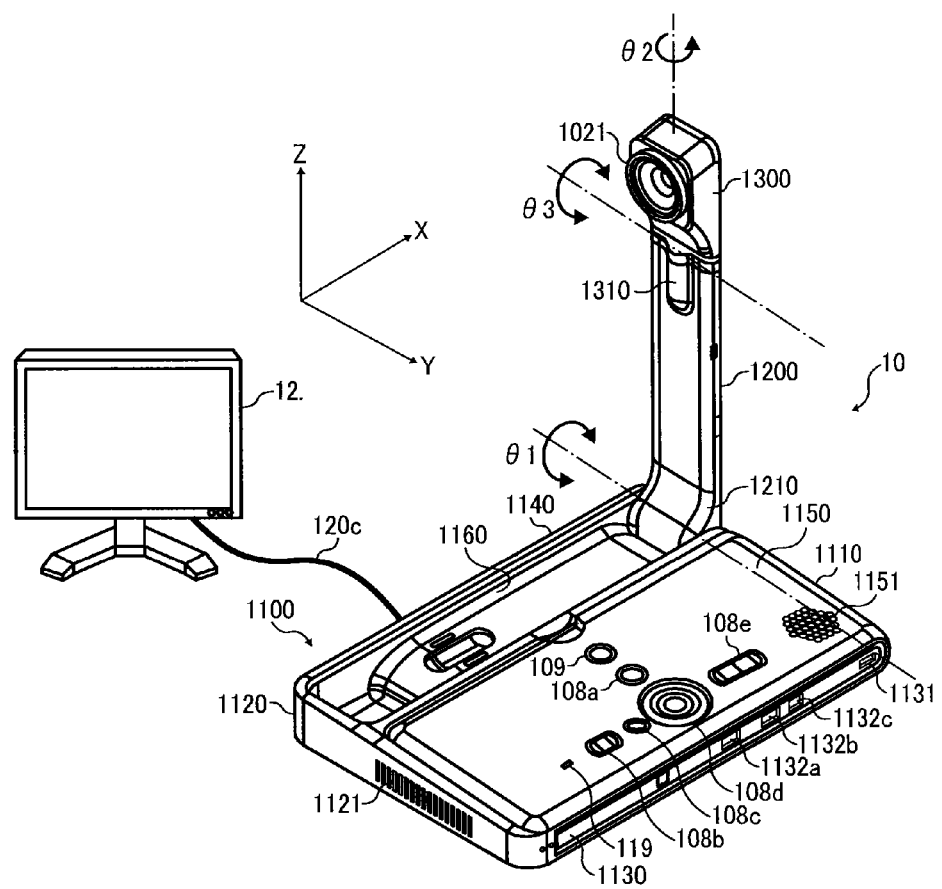
FIG. 3 is a perspective view illustrating the outer appearance of a transmission terminal of the transmission system of FIG. 1.
Figure 4:
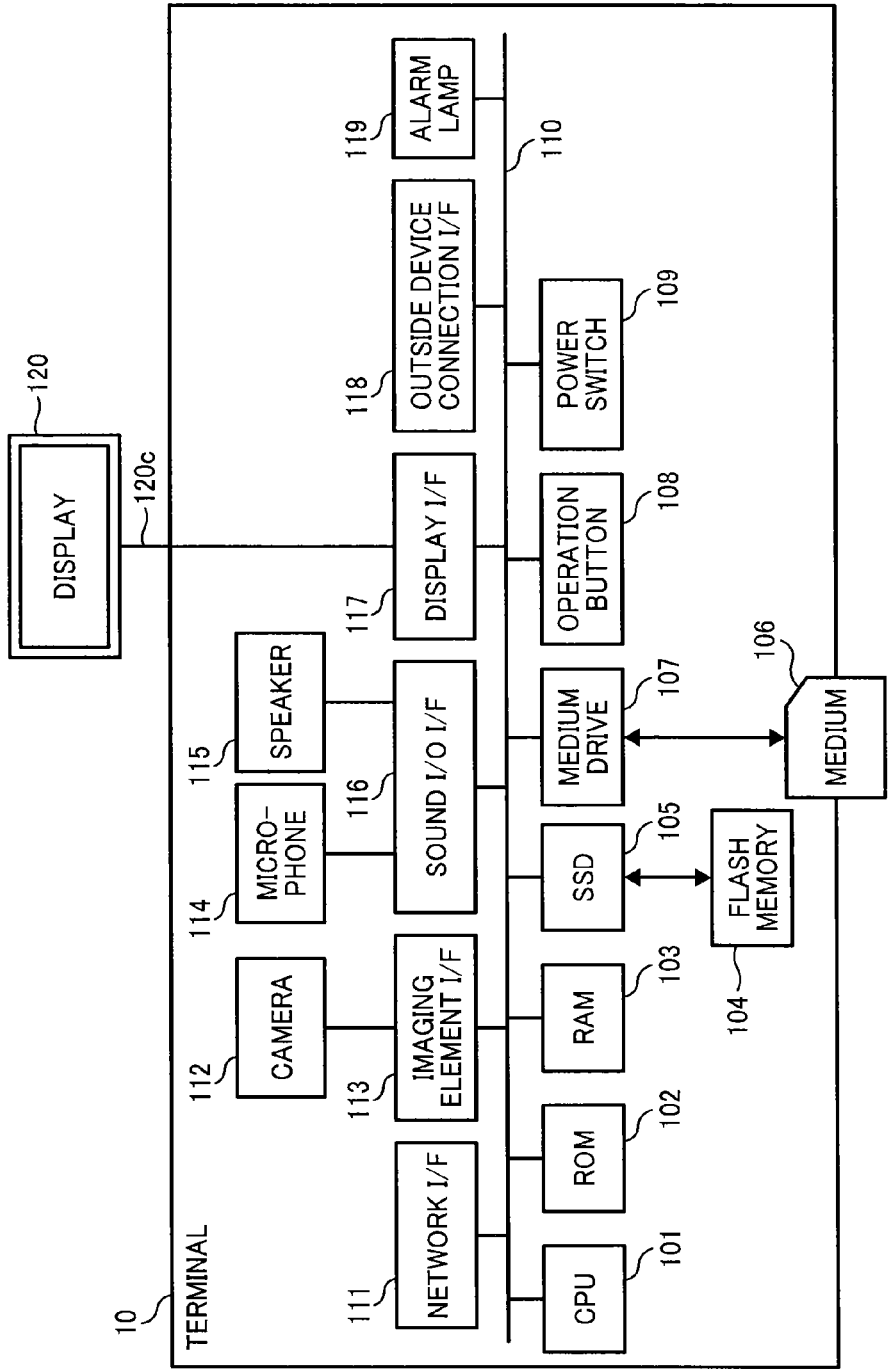
FIG. 4 is a schematic block diagram illustrating a hardware structure of the transmission terminal of FIG. 1.

Referring now to FIGS. 3 and 4, a hardware structure of the terminal 10 is explained according to an example embodiment of the present invention. FIG. 3 is a perspective view illustrating the outer appearance of the terminal 10. FIG. 4 is a schematic block diagram illustrating a hardware structure of the terminal 10. In FIG. 3, the longitudinal direction of the terminal 10 is referred to as X direction. The direction orthogonal to the X direction, which is the horizontal direction of the terminal 10, is referred to as the Y direction. The direction orthogonal to the X direction and the Y direction is referred to as the Z direction.

As illustrated in FIG. 3, the terminal 10 includes a body 1100, an arm 1200, and a camera housing 1300. The body 1100 includes a backside wall 1110 having a plurality of air intake holes that are formed over the nearly entire surface of the intake surface of the backside wall 1110. The body 1100 further includes a front sidewall 1120 provided with an exhaust surface 1121 having a plurality of exhaust holes over the nearly entire surface of the exhaust surface 1121. When a cooling fan that is provided within the body 1100 is driven, air flows in through the intake holes of the intake surface and out through the exhaust holes of the exhaust surface 1121. The body 1100 further includes a right side wall 1130 formed with a sound pickup hole 1131. Through the sound pickup hole 1131, a microphone 114 (FIG. 4) of the terminal 10 is able to catch sounds such as human voice or any sound including noise.

The body 1100 has an operation panel 1150, which is provided at a front surface toward the right side wall 1130. The operation panel 1150 includes a plurality of operation buttons 108a to 108e ("the operation button 108"), a power switch 109, an alarm lamp 119, and a plurality of sound output holes 1151. Through the sound output holes 1151, a speaker 115 (FIG. 4) of the terminal 10 is able to output sounds such as sounds generated based on human voice. The body 1100 further includes a holder 1160, which is provided at the front surface toward the left sidewall 1140. The holder 1160, which has a concave shape, accommodates therein the arm 1200 and the camera housing 1300. The right side wall 1130 is further provided with a plurality of connection ports 1132a to 1132c ("connection ports 1132"). The connection ports 1132 allow electrical connection to an external device through an outside device connection I/F 118 (FIG. 4). The body 1100 further includes a left sidewall 1140, which is provided with a connection port to connect the external display 120 to the display I/F 117 through a cable 120c.

The arm 1200 is fixed to the body 1100 via a torque hinge 1210. With the torque hinge 1210, the arm 1200 can be rotated in directions of up and down with respect to the body, while making a tilt angle θ1 of up to 135 degrees. FIG. 3 illustrates the case where the tilt angle θ1 is 90 degrees.

The camera housing 1300 incorporates therein the camera 112 (FIG. 4) that takes an image of an object. The object may be a part of a user, document, or a room where the terminal 10 is located. The camera housing 1300 is provided with a torque hinge 1310. The camera housing 1300 is fixed to the arm 1200 through the torque hinge 1310. With the torque hinge 1310, the camera housing 1300 can be rotated with respect to the arm 1200, in the direction of up, down, right, and left, such that the camera housing 1300 is kept at a desired position. More specifically, the camera housing 1300 can be rotated, while making a pan angle θ2 from about −180 degrees to 180 degrees in the direction right and left, and a tilt angle θ3 that ranges from about −45 degrees to +45 degrees in the direction of up and down. In FIG. 3, the pan angle θ2 and the tilt angle θ3 are each 0 degree.

The relay device 30, the management system 50, the program providing system 90, and the maintenance system 100 are each implemented by a general-purpose computer such as a personal computer or a server computer. For simplicity, explanation of the outer appearance of the computer is omitted.

Referring to FIG. 4, the terminal 10 includes a central processing unit (CPU) 101, a read only memory (ROM) 102, a random access memory (RAM) 103, a flash memory 104, a solid state drive (SSD) 105, a medium drive 107, the operation button 108, the power switch 109, a network interface (I/F) 111, the camera 112, an imaging element interface (I/F) 113, the microphone 114, the speaker 115, a sound input/output interface (I/O I/F) 116, the display interface (I/F) 117, the outside device connection interface (I/F) 118, and an alarm lamp 119, which are electrically connected through a bus 110 such as an address bus or data bus. The CPU 101 controls entire operation of the terminal 10. The ROM 102 stores therein a control program for execution by the CPU 101, such as an initial program loader (IPL). The RAM 103 functions as a work area of the CPU 101. The flash memory 104 stores therein various data such as the terminal control program, image data, or sound data such as voice data. The SSD 105 controls reading or writing of various data with respect to the flash memory 104 under control of the CPU 101. The medium drive 107 controls reading or writing of various data with respect to a removable recording medium 106 such as a flash memory. The operation button 108 allows the user to input a user instruction, for example, by allowing the user to select a communication destination such as the counterpart terminal 10. The power switch 109 allows the user to switch on or off the power of the terminal 10. The network I/F 111 allows the terminal 10 to transmit data through the communication network 2.

The camera 112 takes an image of an object to obtain image data under control of the CPU 101. The imaging element I/F 113 controls operation of the camera 112. The microphone 114 catches sounds such as voice of the user at the terminal 10. The speaker 115 outputs sounds such as sounds generated based on voice of the user at the counterpart terminal 10. The sound I/O I/F 116 controls input or output of sound signals such as voice signals with respect to the microphone 114 and the speaker 115 under control of the CPU 101. The display I/F 117 transmits image data to the display 120 under control of the CPU 101. The outside device connection I/F 118 controls connection of the terminal 10 to various types of outside device. The alarm lamp 119 generates notification when an error is detected in the terminal 10.

The display 120 may be implemented by a liquid crystal display (LCD) or an organic light emitting display, which displays various data such as an image of an object or an operation icon. As illustrated in FIGS. 3 and 4, the display 120 is connected to the display I/F 117 through the cable 120c. The cable 120c may be implemented by an analog RCB (VGA) signal cable, a component video cable, a high-definition multimedia interface (RDMI) signal cable, or a digital video interactive (DVI) signal cable.

The camera 112 includes a plurality of devices such as a lens system, and a solid-state image sensing device that photo-electrically converts a light to generate an image of an object. For example, the solid-state image sensing device includes a complementary metal oxide semiconductor (CMOS) or a charge coupled device (CCD).

The outside device connection I/F 118 may be connected to an outside device such as an external camera, external microphone, or external speaker through a universal serial bus (USB) cable that is connected through the port 1132 of the body 1100 (FIG. 3). When the external camera is connected to the terminal 10, the CPU 101 causes the terminal 10 to capture an image using the external camera, rather than the camera 112 that is incorporated in the terminal 10. When the external microphone or the external speaker is connected to the terminal 10, the CPU 101 causes the terminal 10 to use the external microphone or the external speaker in replace of the incorporated microphone 114 or the incorporated speaker 115.

The recording medium 106, which can be freely attached to or detached from the terminal 10, includes any desired type of recording medium. In alternative to the flash memory 104, any nonvolatile memory that is readable and writable under control of the CUP 101 may be used such as Electrically Erasable and Programmable ROM (EEPROM).

The terminal control program may be written onto a recording medium that is readable by a general-purpose computer such as the recording medium 106 in any format that is installable or executable by a general-purpose computer. Once the terminal control program is written onto the recording medium, the recording medium may be distributed. Further, the terminal control program may be stored in any desired memory other than the flash memory 104, such as the ROM 102.

Figure 5:
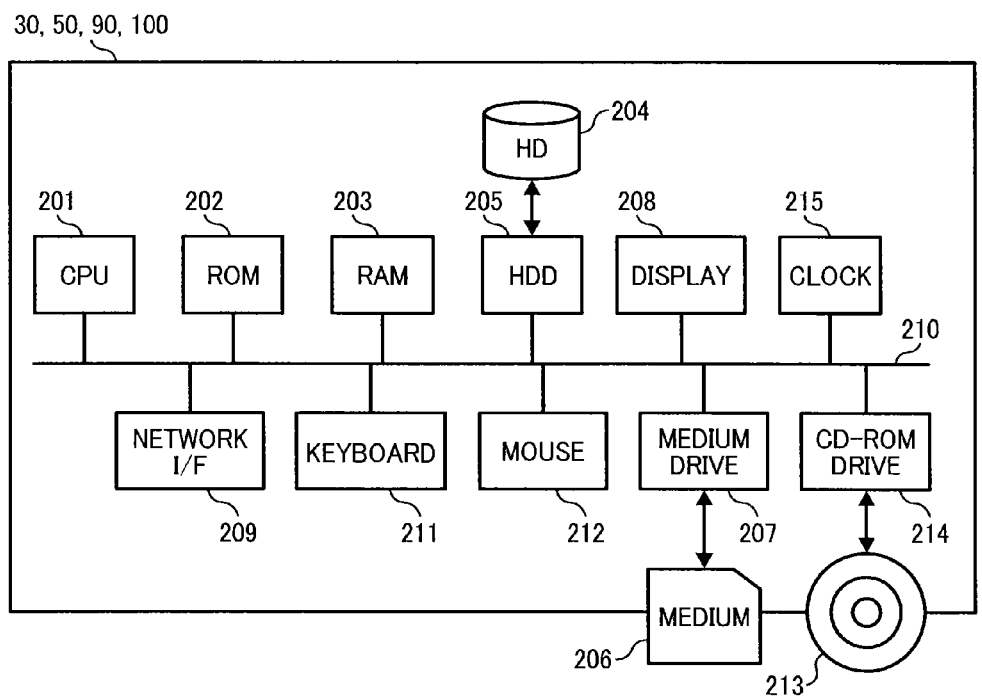
FIG. 5 is a schematic block diagram illustrating a hardware structure of any one of the transmission management system, relay device, program providing system, and maintenance system of the transmission system of FIG. 1.

FIG. 5 illustrates a hardware structure of the management system 50 of FIG. 1. The management system 50 includes a CPU 201, a ROM 202, a RAM 203, the HD 204, a hard disk drive (HDD) 205, a medium drive 207, a display 208, a network interface (I/F) 209, a keyboard 211, a mouse 212, a CD-ROM drive 214, and a clock 215, which are electrically connected through a bus 210 such as an address bus or a data bus.

The CPU 201 controls entire operation of the management system 50. The ROM 202 stores a control program for execution by the CPU 201, such as an IPL. The RAM 203 functions as a work area of the CPU 201. The HD 204 stores therein various data such as the transmission management program. The HDD 205 controls reading or writing of various data with respect to the HD 204 under control of the CPU 201. The medium drive 207 controls reading or writing of various data with respect to a removable recording medium 206 such as a flash memory. The display 208 displays various data such as a cursor, menu, window, character, or image. The network I/F 209 allows the management system 50 to transmit data through the communication network 2. The keyboard 211 includes a plurality of keys, each of which is used for inputting a user instruction through a character, a numeral, or a symbol. The mouse 212 allows the user to input a user instruction including, for example, selection or execution of a specific instruction, selection of an area to be processed, and instruction of cursor movement. The CD-ROM drive 214 controls reading or writing of various data with respect to a CD-ROM 213. In alternative to the CD-ROM 213, any removable recording medium may be used. The clock 215 may be implemented by an internal clock of the management system 50, which is capable of counting a time period.

The transmission management program may be written onto a recording medium that is readable by a general-purpose computer such as the recording medium 206 or the CD-ROM 213 in any format that is installable or executable by a general-purpose computer. Once the transmission management program is written onto the recording medium, the recording medium may be distributed. Further, the transmission management program may be stored in any desired memory other than the HD 204, such as the ROM 202.

The relay device 30 is substantially similar in hardware structure to the management system 50 of FIG. 5, except for replacement of the management program with a relay device control program that is used for controlling the relay device 30. The relay device control program may be written onto a recording medium that is readable by a general-purpose computer such as the recording medium 206 or the CD-ROM 213 in any format that is installable or executable by the general-purpose computer. Once the relay device control program is written onto the recording medium, the recording medium may be distributed. Further, the relay device control program may be stored in any desired memory other than the HD 204, such as the ROM 202.

The program providing system 90 is substantially similar in hardware structure to the management system 50 of FIG. 5, except for replacement of the management program with a program providing program that is used for controlling the program providing system 90. The program providing program may be written onto a recording medium that is readable by a general-purpose computer such as the recording medium 206 or the CD-ROM 213 in any format that is installable or executable by the general-purpose computer. Once the program providing program is written onto the recording medium, the recording medium may be distributed. Further, the program providing program may be stored in any desired memory other than the RD 204, such as the ROM 202.

The maintenance system 100 is substantially similar in hardware structure to the management system 50 of FIG. 5, except for replacement of the management program with a maintenance program that is used for controlling the maintenance system 100. The maintenance program may be written onto a recording medium that is readable by a general-purpose computer such as the recording medium 206 or the CD-ROM 213 in any format that is installable or executable by the general-purpose computer. Once the maintenance program is written onto the recording medium, the recording medium may be distributed. Further, the maintenance program may be stored in any desired memory other than the HD 204, such as the ROM 202.

Other examples of removable recording medium, which may be used in replace of the CD-ROM 213, include, but not limited to, compact disc recordable (CD-R), digital versatile disk (DVD), and blue ray disc.

<Functional Structure of Transmission System>

Figure 6:
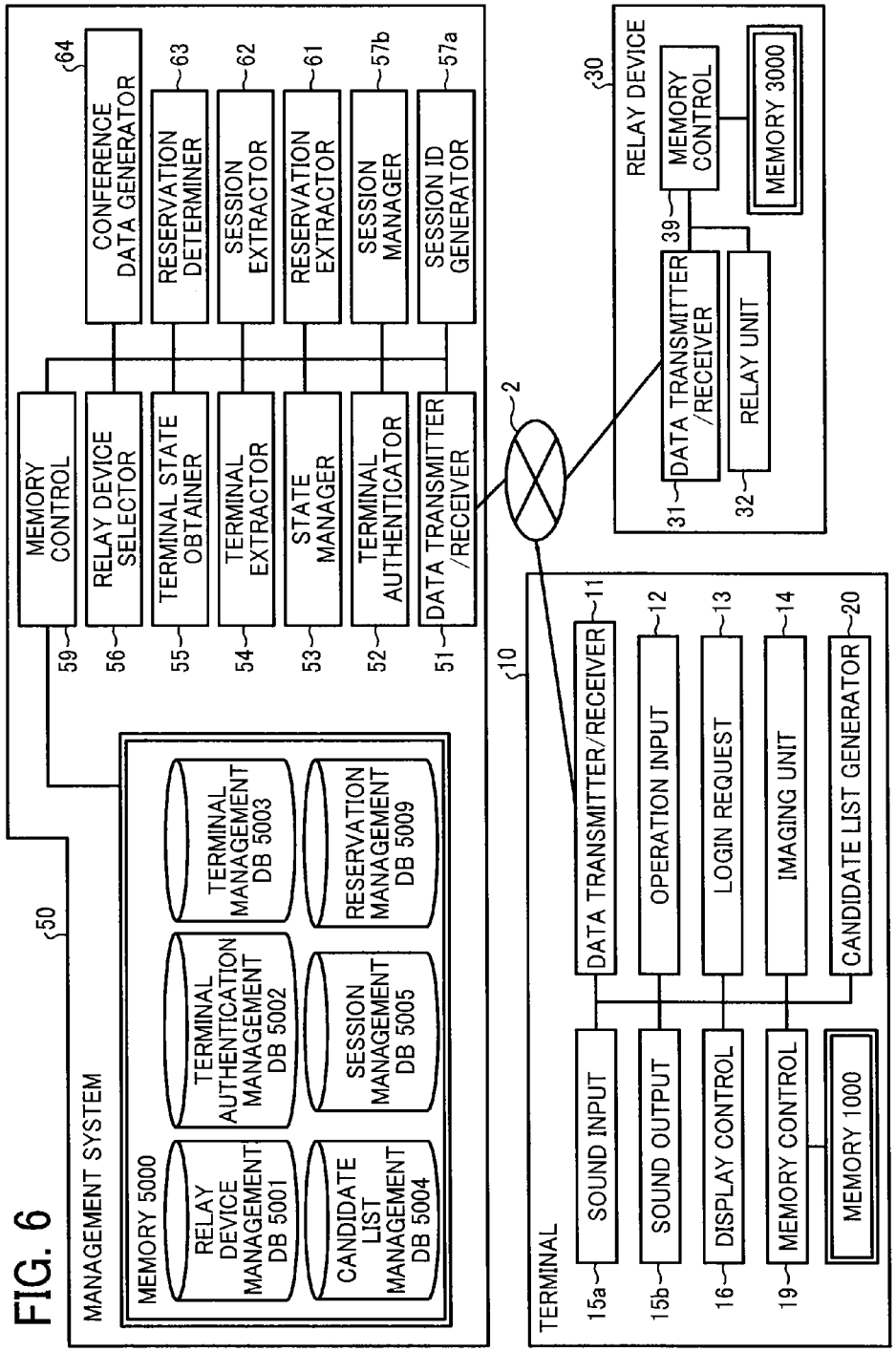
FIG. 6 is a schematic block diagram illustrating a functional structure of the transmission system of FIG. 1.

Next, a functional structure of the transmission system of FIG. 1 is explained according to an example embodiment of the present invention. FIG. 6 is a schematic block diagram illustrating functional structures of the transmission system 1. As illustrated in FIG. 6, the terminal 10, the relay device 30, and the management system 50 exchange data with one another through the communication network 2. In FIG. 6, the program providing system 90 and the maintenance system 100 of FIG. 1 are omitted.

<Functional Structure of Terminal>

Figure 7:
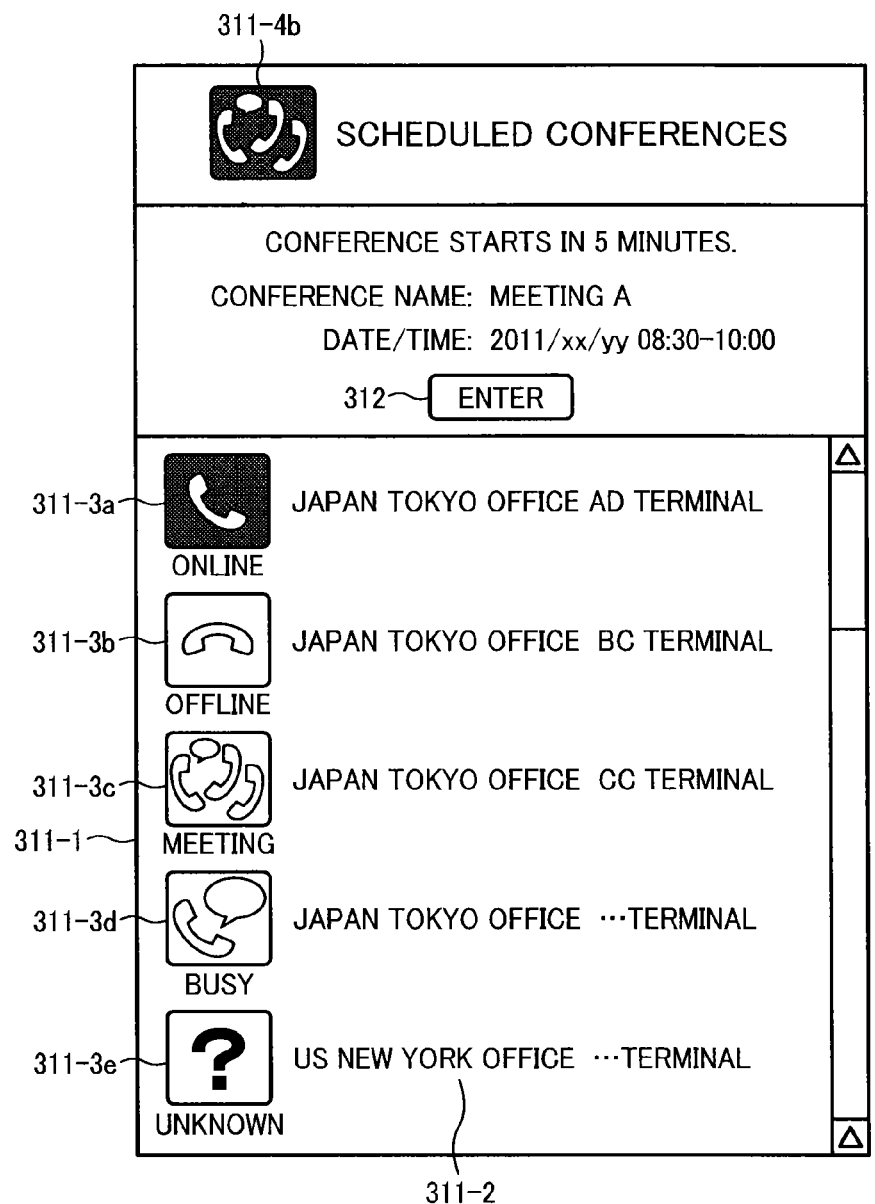
FIG. 7 is an example screen illustrating reservation conference information, displayed at the terminal of FIG. 3.

The terminal 10 includes a data transmitter/receiver 11, an operation input 12, a login request 13, an imaging unit 14, a sound input 15a, a sound output 15b, a display control 16, a memory control 19, and a candidate list generator 20. These units shown in FIG. 6 correspond to a plurality of functions or functional modules, which are executed according to an instruction of the CPU 101 (FIG. 4) that is generated according to the terminal control program being loaded from the flash memory 104 onto the RAM 103. The terminal 10 further includes a memory 1000 that may be implemented by the flash memory 104 and the RAM 103 of FIG. 4. The memory 1000 stores data of a candidate list frame 311-1 (FIG. 7).

Referring now to FIGS. 4 and 6, a functional structure of the terminal 10 is explained according to an example embodiment of the present invention. More specifically, in this example, the operations or functions that are performed by the terminal 10, which include the operations or functions performed by the units shown in FIG. 6, are performed in relation to one or more hardware devices of the terminal 10 that are shown in FIG. 4.

The data transmitter/receiver 11, which may be implemented by the network I/F 111 (FIG. 4) under control of the CPU 101, transmits or receives various data or information to or from another terminal, device, or system, through the communication network 2. In this example, the data transmitter/receiver 11 starts receiving the operation state information that indicates the operation state of each candidate counterpart terminal 10 from the management system 50, before starting communication with any counterpart terminal 10. The operation state of the candidate terminal 10 indicates whether the candidate terminal 10 is online or offline. When the terminal 10 is online, the operation state of the candidate terminal 10 further indicates whether the candidate terminal 10 is available for communication ("communication OK"), the candidate terminal 10 is having communication with the other terminal ("communicating"), or the candidate terminal 10 is not available as the user leaves the seat. The operation state of the candidate terminal 10 may further indicate whether the candidate terminal 10 is online but in trouble or error ("online, communicating, trouble"), the candidate terminal 10 is online but not capable of outputting image data such that only sound data is output, or the candidate terminal 10 is online but in mute state ("online, mute") such that sound data is not output. For example, when the cable 120c is disconnected from the terminal 10, the operation state of the candidate terminal 10 is assumed to be in the trouble state. For the descriptive purposes, in the following examples, it is assumed that the operation state information indicates whether the candidate terminal 10 is online ("online") or offline ("offline"), and if online, whether the candidate terminal 10 is communicating ("communicating").

The operation input 12 receives a user instruction input by the user through the operation button 108 or the power switch 109 (FIG. 4), under control of the instructions received from the CPU 101. For example, when the user selects "ON" using the power switch 109, the operation input 12 receives a user instruction for turning the power on, and causes the terminal 10 to turn on the power.

The operations or functions of the login request 13 are performed according to an instruction received from the CPU 101 (FIG. 4). When the power of the terminal 10 is turned on, the login request 13 automatically causes the data transmitter/receiver 11 to send login request information that requests the login process, and a current IP address of the terminal 10, to the management system 50 through the communication network 2. When the power of the terminal 10 is turned off according to a user instruction received from the user through the power switch 109, the login request 13 causes the data transmitter/receiver 11 to send current operation state information of the terminal 10 to the management system 50, which indicates that the power of the terminal 10 is turned off. After the operation state information is sent, the operation input 12 turns off the power of the terminal 10. As the operation state information of the terminal 10 is sent every time the power is turned off, the management system 50 is able to know that the terminal 10 is offline in realtime.

The operations or functions of the imaging unit 14 of the terminal 10 are performed by the camera 112 and the imaging element I/F 113 according to an instruction received from the CPU 101 (FIG. 4). The imaging unit 14 takes an image of an object to output image data of the object.

The operations or functions of the sound input 15a of the terminal 10 are performed by the sound I/O I/F 116 according to an instruction received from the CPU 101, in cooperation with the microphone 114. After the microphone 114 converts sounds of the user at the terminal 10 to a sound signal, the sound input 15a inputs the sound signal in the form of sound data for further processing. The operations or functions of the sound output 15b of the terminal 10 are performed by the sound I/O I/F 116 according to an instruction received from the CPU 101, in cooperation with the speaker 115. The sound output 15b outputs a sound signal of sound data that is received from the counterpart terminal 10 through the speaker 115.

The operations or functions of the display control 16 of the terminal 10 are performed by the display I/F 117 according to an instruction received from the CPU 101 (FIG. 4). The display control 16 controls transmit of image data, which is generated based on image data received from the counterpart terminal 10, to the display 120.

The display control 16 further causes the display 120 that is provided for the terminal 10 to display conference reservation information, such as a conference reservation information screen of FIG. 7, based on information received from the management system 50. As illustrated in FIG. 7, the conference reservation information includes, for each scheduled (reserved) conference that is previously registered, information indicating the date and time at which the reserved conference is scheduled to start ("start date/time"), the date and time at which the reserved conference is scheduled to end ("end date/time"), information used for identifying the reserved conference such as the conference name, and a reminder message indicating a time period counted from the current date/time to the start date/time.

The conference reservation information screen of FIG. 7 further includes a candidate list frame 311-1, which displays therein a list of one or more terminals that are scheduled to participate in the reserved conference. More specifically, the candidate list frame 311-1 displays, for each one of the terminals 10 that are scheduled to attend the reserved conference, a terminal name 311-2 that may be any type of identification information for identifying the terminal 10, and an icon that reflects the operation state of the terminal 10 that is scheduled to attend the conference, side by side. In this example shown in FIG. 7, five types of icons 311-3a, 311-3b, 311-3c, 311-3d, and 311-3e are displayed, each reflecting the specific operation state of the terminal 10. The icon 311-3a indicates that the terminal 10 is online and is available for communication. The icon 311-3b indicates that the terminal 10 is offline, and is not available for communication. The icon 311-3c indicates that the terminal 10 is participating in the reserved conference "meeting A" specified by the conference reservation information being displayed, such that the terminal 10 has the specific operation state "meeting". The icon 311-3d indicates that the terminal 10 is participating in communication other than the reserved conference "meeting A", such that the terminal 10 has the specific operation state "busy". The icon 311-3e indicates that the operation state of the terminal 10 is not notified, such that the specific operation state is "unknown". The display control 16 further causes the display 120 to display a "Enter" key 312, which allows the user at the terminal 10 to participate in the reserved conference "meeting A". Based on selection of the "Enter" key 312, the terminal 10 receives a user instruction for participating in the reserved conference having the conference reservation information being displayed on the screen.

The memory control 19 is implemented by the SSD 105 of FIG. 4 according to an instruction received from the CPU 101. The memory control 19 stores various data in the memory 1000, or reads out various data from the memory 1000. The memory 1000 stores therein various data such as terminal identification (ID) information for identifying the terminal 10, and a password for authenticating a user at the terminal 10. The memory 1000 further stores therein image data and/or sound data that is received as the terminal 10 communicates with a counterpart terminal 10 such that the image data and/or sound data are overwritten. Before the image data is overwritten, an image generated based on the image data is displayed onto the display 120. Before the sound data is output, sounds generated based on the sound data is output through the speaker 150.

In this example, any one of the terminal ID of the terminal 10 and the relay device ID of the relay device 30 includes any type of identification information that can be expressed by any language, character, symbol, mark, or any combination of language, character, symbol, and mark.

The candidate list generator 20 generates or updates the conference reservation information to be displayed on the display 120. As described above referring to FIG. 7, the conference reservation information includes information regarding the specific operation state of each one of the participating terminals 10 that are scheduled to participate in the reserved conference, based on information received from the management system 50.

<Functional Structure of Relay Device>

Now, a functional structure of the relay device 30 is explained. The relay device 30 includes a data transmitter/receiver 31, a relay unit 32, and a memory control 39. These units shown in FIG. 6 correspond to a plurality of functions or functional modules, which are executed according to an instruction of the CPU 201 (FIG. 5) that is generated according to the relay device control program being loaded from the HD 204 onto the RAM 203. The relay device 30 further includes a memory 3000 that may be implemented by the RAM 203 and/or the HD 204 (FIG. 5).

(Functional Structure of Relay Device)

Next, a functional structure of the relay device 30 is explained according to an example embodiment of the present invention. More specifically, in this example, the operations or functions that are performed by the relay device 30, which include the operations or functions performed by the units shown in FIG. 6 are performed in cooperation with one or more hardware devices of the relay device 30 that are shown in FIG. 5.

The data transmitter/receiver 31, which may be implemented by the network I/F 209 (FIG. 5), transmits or receives various data or information to or from another terminal, device, or system, through the communication network 2, under control of instructions received from the CPU 201.

The relay unit 32, which may be implemented by instructions received from the CPU 201 (FIG. 5), relays contents data between or among the terminals 10 through the data transmitter/receiver 31, in the contents data session "sed".

The memory control 39 is implemented by the HDD 205 of FIG. 5 according to an instruction received from the CPU 201. The memory control 39 stores various data in the memory 3000, or reads out various data from the memory 3000.

<Functional Structure of Management System>

The management system 50 includes a data transmitter/receiver 51, a terminal authenticator 52, a state manager 53, a terminal extractor 54, a terminal state obtainer 55, a relay device selector 56, a session ID generator 57a, a session manager 57b, a memory control 59, a reservation extractor 61, a session extractor 62, a reservation determiner 63, and a conference data generator 64. These units shown in FIG. 6 correspond to a plurality of functions or functional modules, which are executed according to an instruction of the CPU 201 (FIG. 5) that is generated according to the transmission management program being loaded from the HD 204 onto the RAM 203. The management system 50 further includes a memory 5000, which may be implemented by the HD 204 (FIG. 5).

(Relay Device Management Table)

The memory 5000 includes a relay device management database (DB) 5001, which stores therein a relay device management table of FIG. 8. The relay device management table of FIG. 8 stores the IP address of the relay device 30 for each relay device ID of the relay device 30. For example, for the relay device 30a having the relay terminal ID "111a", the relay device management table of FIG. 8 indicates that the IP address of the relay device 30a is "1.2.1.2".

(Terminal Authentication Management Table)

The memory 5000 further includes a terminal authentication management database (DB) 5002, which stores a terminal authentication management table of FIG. 9. The terminal authentication management table of FIG. 9 stores a plurality of terminal IDs respectively assigned to the terminals 10 that are managed by the management system 50, in association with a plurality of passwords that are previously determined for the respective terminals 10. For example, referring to the terminal authentication management table of FIG. 9, the terminal 10aa having the terminal ID "01aa" is assigned with the password "aaaa".

(Terminal Management Table)

The memory 5000 further includes a terminal management database (DB) 5003, which stores a terminal management table of FIG. 10. The terminal management table of FIG. 10 stores, for each one of the terminal IDs assigned to the terminals 10, the terminal name to be used for communication with the terminal 10, the operation state of the terminal 10, and the IP address of the terminal 10. For example, for the terminal 10aa having the terminal ID "01aa", the terminal management table of FIG. 10 indicates that the terminal name is "Japan Tokyo Office AA terminal", the operation state is online ("ONLINE"), and the IP address of the terminal 10aa is "1.2.1.3".

(Candidate List Management Table)

The memory 5000 further includes a candidate list management database (DB) 5004, which stores a candidate list management table of FIG. 11. The candidate list management table of FIG. 11 stores, for each one of a plurality of request terminals 10 capable of requesting for videoconference communication, the terminal ID of the request terminal 10, and one or more terminal IDs that are respectively assigned to candidate terminals 10 that are previously registered for the request terminal 10. In this example, for the request terminal 10, one or more terminals 10 of the transmission system 1 of FIG. 1 are previously registered as the candidate terminal 10. For example, the candidate list management table of FIG. 11 indicates that the request terminal 10aa having the terminal ID "01aa" is most likely to request for videoconference with respect to the terminal 10ab having the terminal ID "01ab", the terminal 10ba having the terminal ID "01ba", and the terminal 10bb having the terminal ID "01bb", etc. The management system 50 manages the candidate list management table of FIG. 11, for example, according to a user instruction received from any one of the terminals 10. For example, in response to a user instruction received from the terminal 10aa, the management system 50 may add or delete the contents of the candidate list management table of FIG. 11.

(Session Management Table)

The memory 5000 further includes a session management database (DB) 5005, which stores a session management table of FIG. 12. The session management table of FIG. 12 stores information regarding each of the sessions that are currently carried out by at least two terminals 10 of the transmission system 1. More specifically, for each session ID that uniquely identifies each contents data session "sed" being carried, the session management table of FIG. 12 stores a reservation ID that identifies a reserved conference that corresponds to the contents data session "sed", a relay device ID of the relay device 30 that transmits or receives contents data such as image data and sound data through the contents data session "sed", a terminal ID of each one of the terminals 10 currently participating in the contents data session "sed". For example, referring to the session management table of FIG. 12, the contents data session having the session ID "se03" is a session to carry out a conference that is previously scheduled with the reservation ID "rsv08", using the relay device 30 having the relay device ID "111c" that relays contents data between the terminal 10ae having the terminal ID "01ae" and the terminal 10dc having the terminal ID "01dc". In this example, the terminal 10ae is a terminal 10 that resides on a network outside the transmission system 1 of FIG. 1. For any contents data session that is not established to carry out a reserved conference, the "reservation ID" field remains blank.

(Reservation Management Table)

The memory 5000 further stores a reservation management database (DB) 5009, which stores a reservation management table of FIG. 13. The reservation management table of FIG. 13 is used to manage various information regarding a conference that is previously scheduled as a reserved conference. The reservation management table of FIG. 13 stores, for each of the reservation IDs that uniquely identifies a reserved conference, the date and time at which the reserved conference is scheduled to start, the date and time at which the reserved conference is scheduled to end, the conference name to be used for identifying the reserved conference, and the terminal ID of each one of the terminals 10 that are registered as the terminals 10 participating in the reserved conference. For example, referring to the reservation management table of FIG. 13, the conference assigned with the reservation ID "rsv03" is scheduled to start at "2011/11/10, 15:00 PM" and end at "2011/11/10, 17:00 PM". The conference has the conference name "Security meeting". The terminal IDs of the participating terminals 10 are "01ca" and "01db". The reservation ID, the start date/time, the end date/time, the conference name, and the terminal ID of the reservation management table may be managed by the management system 50, according to an instruction received through the terminal 10, for example, by adding or deleting the contents in each data field through the memory control 59.

(Functional Structure of Management System)

Next, a functional structure of the management system 50 is explained according to an example embodiment of the present invention. In this example, the operations or functions that are performed by the management system 50, which include the operations or functions performed by the units shown in FIG. 6, are performed in relation to one or more hardware devices of the management system 50 that are shown in FIG. 5.

The data transmitter/receiver 51, which may be implemented by the network I/F 209 (FIG. 5) according to an instruction received from the CPU 201, transmits or receives various data or information to or from another terminal, device, or system through the communication network 2. The data transmitter/receiver 51 has the function of transmitting data, or the function of receiving data.

Under control of the CPU 201 (FIG. 5), the terminal authenticator 52 obtains a terminal ID and a password from the login request information that is received from the data transmitter/receiver 51. Using the terminal ID and the password as a search key, the terminal authenticator 52 searches the terminal authentication management DB 5002 (FIG. 9) to determine whether the obtained set of terminal ID and password is registered. Based on the search result, the terminal authenticator 52 determines whether the user at the terminal 10 or the terminal 10 is allowed for access.

The state manager 53, which operates according to an instruction received from the CPU 201 (FIG. 5), manages the operation state of the terminal 10 such as the operation state of the request terminal 10 that sends the login request information, using the terminal management table stored in the terminal management DB 5003 (FIG. 10). The terminal management DB 5003 stores therein the terminal ID of the terminal 10, the operation state of the terminal 10, and the IP address of the terminal 10, in association with one another. For example, when the power of the terminal 10 is switched from the ON state to the OFF state according to a user instruction received through the power switch 109, the state manager 53 receives the operation state information of the terminal 10 indicating that the terminal 10 is turned off, from the terminal 10. Based on the operation state information of the terminal 10, the state manager 53 changes the operation state information of the terminal 10 that is stored in the terminal management DB 5003 from the on-line state to the off-line state.

The terminal extractor 54, which operates according to an instruction received from the CPU 201 (FIG. 5), searches the candidate list management DB 5004 (FIG. 11) using the terminal ID of the request terminal 10 that sends the login request information as a key to obtain a list of terminal IDs each being assigned to a plurality of candidate terminals 10 for the request terminal 10. Additionally, the terminal extractor 54 searches the candidate list management DB 5004 (FIG. 11) using the terminal ID of the request terminal 10 that sends the login request as a key to obtain a terminal ID of another request terminal 10 that registers the request terminal 10 as a candidate terminal for another request terminal 10.

The terminal state obtainer 55, which operates under control of the CPU 201 (FIG. 5), searches the terminal management DB 5003 (FIG. 10) using the terminal ID of each candidate terminal 10 that is extracted by the terminal extractor 54 as a key to obtain the operation state information of each candidate terminal 10. More specifically, the terminal state obtainer 55 obtains the operation state of each candidate counterpart terminal 10 that is previously registered as a candidate counterpart terminal for the request terminal 10 that sends the login request information. Further, the terminal state obtainer 55 searches the terminal management DB 5003 (FIG. 10) using the terminal ID of the request terminal 10 that is extracted by the terminal extractor 54 as a key to obtain the operation state information of the request terminal 10 that sends the login request information. Further, the terminal state obtainer 55 searches the terminal management DB 5003 using the terminal ID of a candidate request terminal 10 that is extracted by the terminal extractor 54 as a key to obtain the operation state information of the candidate request terminal 10 that lists the request terminal 10 that sends the login request information as a candidate counterpart terminal.

The relay device selector 56, which operates according to the instructions received from the CPU 201 (FIG. 5), selects one of the relay devices 30 that is used to relay contents data between or among the plurality of terminals 10 through the contents data session "sed".

The session ID generator 57a, which operates according to the instructions received from the CPU 201 (FIG. 5), generates a session ID that identifies the contents data session "sed", as the contents data session "sed" is newly established between or among the plurality of terminals 10.

The session manager 57b, which operates according to the instructions received from the CPU 201 (FIG. 5), stores the session ID generated by the session ID generator 57a, the reservation ID that uniquely identifies the reserved conference on which the contents data session "sed" is based, and the terminal ID of each one of the terminals 10 participating in that session, in a corresponding manner, in the session management DB 5005 (FIG. 12) of the memory 5000. The session manager 57b further stores, for each session ID, the relay device ID of the relay device 30 that is selected by the relay device selector 56 as a relay device that relays contents data, in the session management DB 5005 (FIG. 12).

The memory control 59 is implemented by the HDD 205 of FIG. 5 according to an instruction received from the CPU 201. The memory control 59 stores various data in the memory 5000, or reads out various data from the memory 5000.

The reservation extractor 61, which operates according to the instructions received from the CPU 201 (FIG. 5), searches the reservation management table stored in the reservation management DB (FIG. 13) using a reservation 1D obtained from the request terminal 10, which requests for conference information, to obtain the terminal ID of one or more terminals 10 that are stored in association with the reservation ID. The reservation extractor 61 may further search the reservation management table (FIG. 13) using the reservation ID as a search key to extract additional information regarding the reserved conference, such as the date/time at which the reserved conference is scheduled to start, the date/time at which the reserved conference is scheduled to end, and a name of the reserved conference.

The session extractor 62, which operates according to the instructions received from the CPU 201 (FIG. 5), searches the session management table stored in the session management DB 5005 (FIG. 12) using the terminal ID of the counterpart terminal 10 as a search key to extract a reservation ID that is associated with the terminal ID of the counterpart terminal 10.

The reservation determiner 63, which operates according to the instructions received from the CPU 201 (FIG. 5), determines whether the reservation ID extracted by the reservation extractor 61 matches the reservation ID transmitted from the request terminal 10.

The conference data generator 64 generates conference information including information regarding the specific operation state of the counterpart terminal 10. For example, the conference data generator 64 determines the specific operation state of the counterpart terminal 10, and includes such information as a part of the conference information for display to the user at the request terminal 10.

<Operation of Transmission System>

Figure 14:
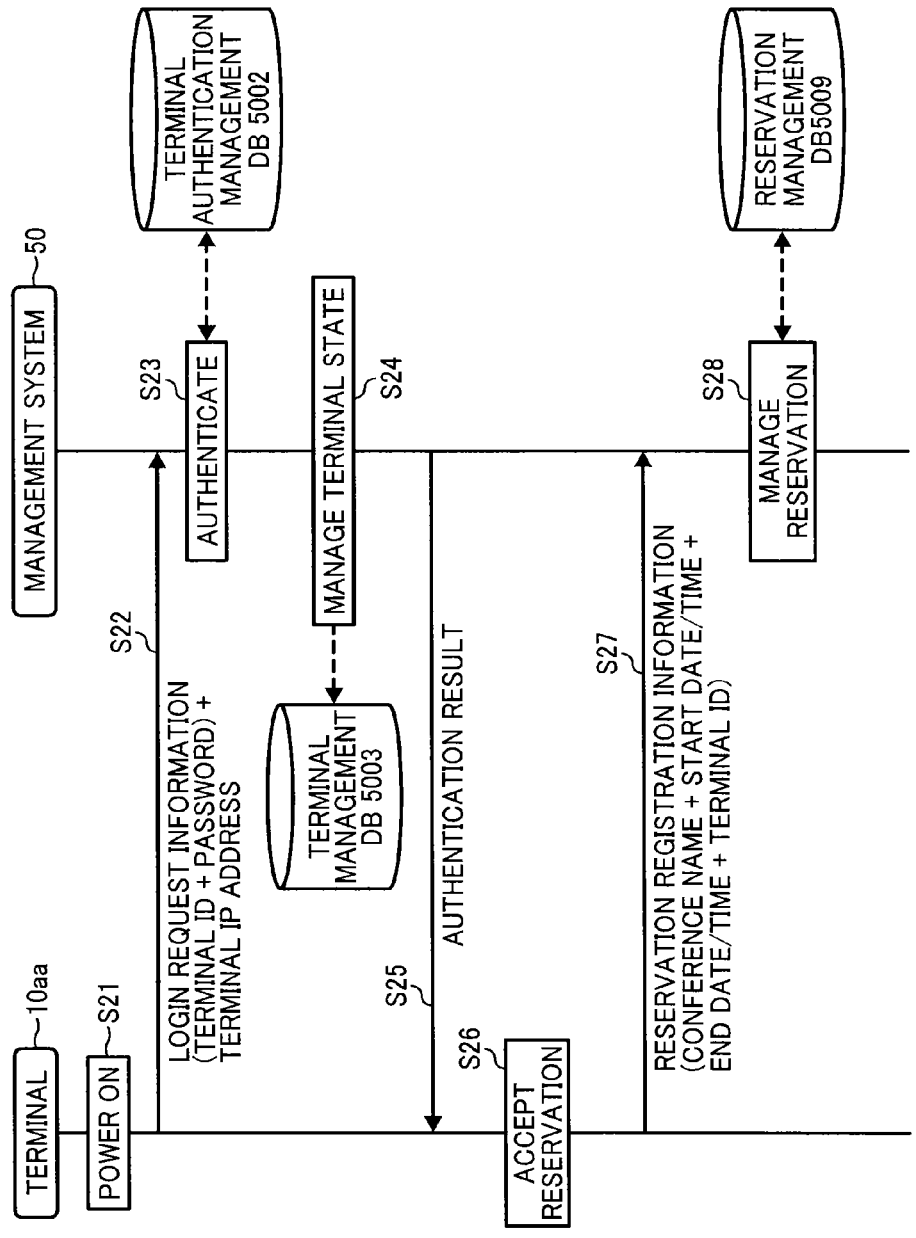
FIG. 14 is a data sequence diagram illustrating operation of establishing communication among two or more terminals of the transmission system of FIG. 1, according to an example embodiment of the present invention.

Referring now to FIGS. 14 and 15, operation of registering a conference, performed by the transmission system 1 of FIG. 1 in response to a request from the request terminal 10aa is explained, according to an example embodiment of the present invention. FIG. 14 is a data sequence diagram illustrating operation of registering a conference to be performed between or among the plurality of terminals 10. In FIG. 14, management data is transmitted or received through the management data session "sei" of FIG. 2. FIG. 15 is an illustration of an example registration screen to be displayed to the user at the request terminal 10aa.

Referring to FIG. 14, at S21, the user at the request terminal 10aa turns on the power of the request terminal 10aa through the power switch 109 (FIG. 4). The operation input 12 of the request terminal 10aa (FIG. 6) turns on the power of the request terminal 10aa.

At S22, as the power of the request terminal 10aa is turned on, the login request 13 of the request terminal 10aa automatically causes the data transmitter/receiver 11 to send the login request information that requests the login process to the management system 50 through the communication network 2. The login request information includes a terminal ID that identifies the request terminal 10aa, and a password associated with the terminal ID of the request terminal 10aa. The terminal ID and the password may be obtained by the memory control 19 from the memory 1000, and sent to the data transmitter/receiver 11. At the time of sending the login request information from the request terminal 10aa to the management system 50, the request terminal 10aa sends an IP address of the request terminal 10aa such that the management system 50 can obtain the IP address of the request terminal 10aa.

At S23, the terminal authenticator 52 of the management system 50 searches the terminal authentication management table (FIG. 9) stored in the memory 5000 using the terminal ID and the password of the login request information received through the data transmitter/receiver 51, to determine whether the terminal ID and the password stored in the terminal authentication management table matches the terminal ID and the password of the login request information. When it is determined that the terminal ID and the password of the login request information matches the terminal ID and the password stored in the terminal authentication management DB 5002, the terminal authenticator 52 determines that the terminal 10aa is authenticated.

At S24, when the terminal authenticator 52 authenticates that the login request information is received from the authenticated terminal 10, the state manager 53 of the management system 50 stores the operation state and the IP address of the terminal 10aa, with respect to the terminal ID and the terminal name of the terminal 10aa in the terminal management table (FIG. 10) to create or update a record of the terminal 10aa. Using the terminal management table of FIG. 10, which stores the operations state of online and the terminal IP address of "1.2.1.3" in association with the terminal ID "01aa" and the terminal name "AA Terminal", various information regarding the terminal 10aa can be managed.

At S25, the data transmitter/receiver 51 of the management system 50 sends the authentication result obtained by the terminal authenticator 52 to the request terminal 10aa that has sent the login request information through the communication network 2. As described above, in this example, it is assumed that the terminal authenticator 52 determines that the terminal 10aa is an authenticated terminal.

At S26, the display control 16 of the terminal 10aa displays a registration screen of FIG. 15 on the display 120aa. Through the registration screen, the user at the terminal 10aa inputs various information regarding a conference to be registered. The operation input 12 receives a user input including, for example, the conference name, the start date/time, the end date/time, and one or more terminals 10 that are scheduled to participate in the conference.

At S27, the data transmitter/receiver 11 of the terminal 10aa transmits conference reservation registration information ("reservation registration information") to request for registering a conference, to the management system 50. More specifically, the conference reservation registration information includes various information obtained through the user input, such as the conference name, the start date/time, the end date/time, and the terminal ID of each of the terminals 10 that are scheduled to participate in that conference.

At S28, when the data transmitter/receiver 51 of the management system 50 receives the reservation registration information, the memory control 59 stores the received reservation registration information, such as the conference name, the start date/time, the end date/time, and the terminal IDs of the participating terminals 10, in the registration management table of FIG. 13, in association with a reservation ID that identifies the reserved conference that is registered. In this example, the reservation ID is generated at the management system 50, when registering the conference. For example, assuming that the user at the terminal 10aa inputs various information as illustrated in FIG. 15, the reservation management table of FIG. 13 stores, for the reservation ID "rsv02", the start date/time "2011/11/10 13:30", the end date/time "2011/11/10 14:50", the conference name "Strategy Meeting", and the terminal IDs "01aa" "01ab" and "01db" that respectively correspond to the terminal 10aa, the terminal 10ab, and the terminal 10db. The operation of registering the conference ends at S28.

Figure 16:
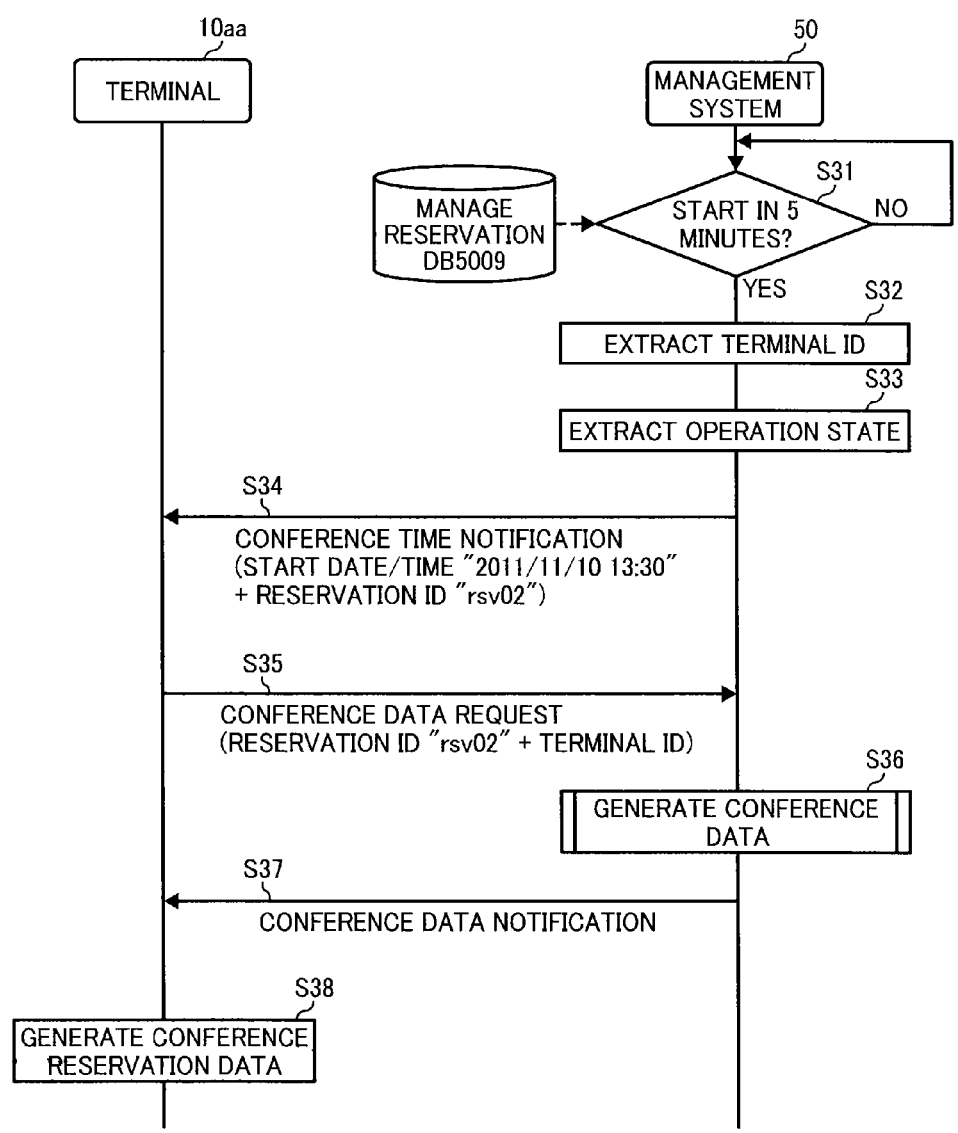
FIG. 16 is a data sequence diagram illustrating operation of transmitting information regarding a scheduled conference from the management system of FIG. 6 to the terminal of FIG. 6, according to an example embodiment of the present invention.

Referring now to FIG. 16, operation of transmitting information regarding the reserved conference to the terminal 10aa, which is scheduled to start communication based on the reserved conference, performed by the management system 50, is explained according to an example embodiment of the present invention. In FIG. 16, various management data is transmitted or received through the management data communication session "sei".

At S31, when the management system 50 determines that the current time reaches a time, which is five minutes before the start date/time when the next reserved conference starts, ("YES" at S31), the operation proceeds to S32. For example, it is assumed that the clock 215 of the management system 50 outputs the current date/time "2011/11/10, 13:25". The reservation extractor 61 refers to the reservation management table of FIG. 13 to determine that it is five minutes before the start date/time at which the reserved conference with the reservation ID "rsv02" starts. In such case, the management system 50 starts operation of determining whether to send notification regarding the reserved conference. In this example, the management system 50 starts operation of determining whether to send notification regarding the reserved conference when the current date/time is five minutes before the start date/time of the reserved conference. Alternatively, the management system 50 may be programmed to start operation of determining whether to send notification regarding the reserved conference at any time. For example, the time at which the operation of generating the information starts may be a predetermined time period before the conference start date/time, at the conference start date/time, or a predetermined time period after the conference start date/time.

At S32, the reservation extractor 61 searches the reservation management table of FIG. 13 using the reservation ID "rsv02", which identifies the reserved conference that will start in five minutes, as a search key to extract the terminal IDs of the terminals 10 that are scheduled to participate in that reserved conference. In this example, the terminal IDs "01aa" "01ab" and "01db" are extracted, from the reservation management table of FIG. 13.

At S33, the terminal extractor 54 searches the terminal management table of FIG. 10, using the extracted terminal IDs of the terminals 10 ("the participating terminals 10") that are scheduled to participate in the reserved conference, as a search key to extract the operation states of the participating terminals 10, respectively.

At S34, the data transmitter/receiver 51 transmits conference time notification to one or more of the participating terminals 10, having the operation state that is not "offline" or "communicating". More specifically, in this example, as illustrated in FIG. 10, the management system 50 determines to send the conference time notification to the terminal 10aa, which has the operation state "online". The conference time notification includes the reservation ID "rsv02" and the start date/time "2011/11/10, 13:30" of the reserved conference.

At S35, the terminal 10aa, which receives the conference time notification, may request the management system 50 for further information such as information indicating whether any one of the other participating terminals 10 is on the meeting. More specifically, the terminal 10aa transmits a conference data request to the management system 50, which includes the reservation ID "rsv02" and the terminal ID "01aa" of the terminal 10.

At S36, the management system 50, which receives the conference data request, generates conference data including specific information regarding the reserved conference.

Figure 17:
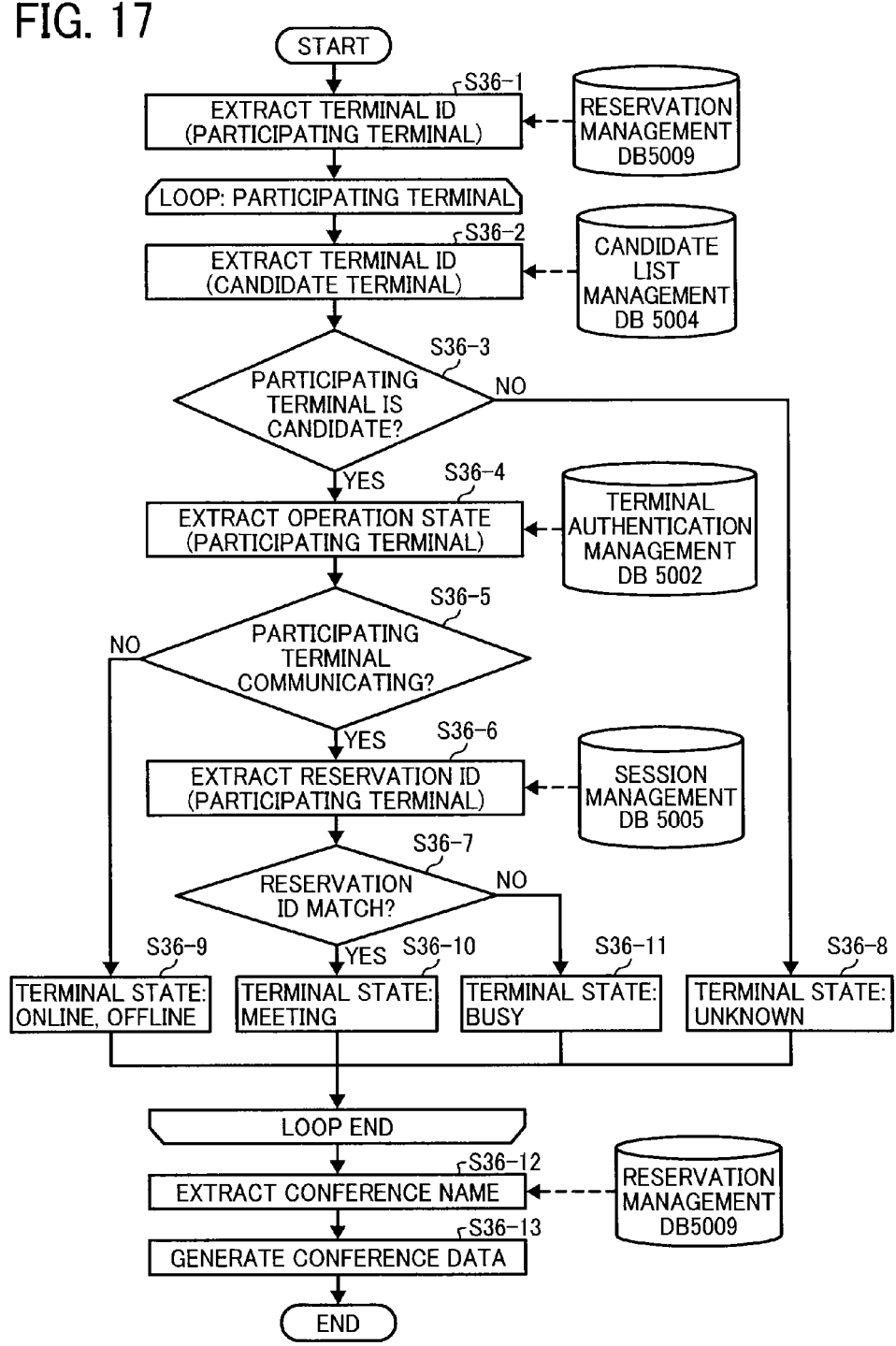
FIG. 17 is a flowchart illustrating operation of generating conference data, performed by the management system of FIG. 6, according to an example embodiment of the present invention.

Referring now to FIG. 17, operation of generating conference data is explained according to an example embodiment of the present invention.

At S36-1, the reservation extractor 61 of the management system 50 searches the reservation management table of FIG. 13 using the reservation ID "rsv02" as a search key, which is obtained from the conference data request transmitted from the terminal 10aa, to obtain the terminal IDs of the other participating terminals 10. In this example, the terminal IDs of the participating terminals 10 other than the terminal 10aa are "01ab" and "01db".

The management system 50 obtains, for each one of the participating terminals 10 that are extracted at S36-1, the specific operation state of the participating terminal 10. Accordingly, S36-2 to any one of S36-8, S36-9, S36-10, and S36-11 is performed for each one of the participating terminals 10.

At S36-2, the terminal extractor 54 searches the candidate list management table of FIG. 11 using the terminal ID "01aa" of the terminal 10aa that requests for conference data, to extract the terminal IDs of the candidate counterpart terminals 10 for the terminal 10aa. For example, the terminal IDs "01ab", "01ba", etc. are extracted.

At S36-3, the reservation determiner 63 determines whether the terminal ID of the participating terminal 10 matches any one of the terminal IDs "01ab", "01ba", etc. of the candidate counterpart terminals 10 for the terminal 10aa.

When it is determined that the terminal ID of the participating terminal 10 does not match any one of the terminal IDs of the candidate counterpart terminals 10 of the request terminal 10aa ("NO" at S36-3), the operation proceeds to S36-8. At S36-8, the reservation data generator 64 determines that the specific operation state of the participating terminal 10 is "unknown". For example, referring to FIG. 11, assuming that the user at the terminal 10ab registers a conference, the terminal 10cc that is not registered as a candidate counterpart terminal for the terminal 10aa may be selected as the participating terminal 10 that is scheduled to participate in the reserved conference. In such case, the specific operation state of the terminal 10cc may be set to "unkown", as the terminal 10cc is not registered as a candidate counterpart terminal of the terminal 10aa. This prevents the terminal 10aa from being notified of the specific operation state of the terminal 10cc that is not the candidate counterpart terminal for the terminal 10aa.

When it is determined that the terminal ID of the participating terminal 10 matches any one of the terminal IDs of the candidate counterpart terminals 10 for the request terminal 10aa ("YES" at S36-3), at S36-4, the state extractor 55 searches the terminal management table of FIG. 10 using the terminal ID of the participating terminal 10 as a search key to obtain the operation state of the participating terminal 10. In this example, the operation state "online", "offline", or "communicating" is extracted.

At S36-5, the conference data generator 64 determines whether the extracted operation state of the participating terminal 10 is "communicating". When it is determined that the extracted operation state of the participating terminal 10 is not "communicating" ("NO" at S36-5), the operation proceeds to S36-9. At S36-9, the conference data generator 64 determines that the specific operation state of the participating terminal 10 is either "online" or "offline", depending on the operation state extracted at S36-4.

When it is determined that the extracted operation state of the participating terminal 10 is "communicating" ("YES" at S36-5), the operation proceeds to S36-6. At S36-6, the session extractor 62 searches the session management table of FIG. 12 using the terminal ID of the participating terminal 10 as a search key to extract the reservation 1D that is associated with the terminal ID of the participating terminal 10.

At S36-7, the reservation determiner 63 determines whether the reservation ID extracted by the session extractor 62 at S36-6, which is the reservation ID associated with the participating terminal 10, matches the reservation ID included in the conference data request transmitted from the terminal 10aa.

When it is determined that the reservation ID associated with the participating terminal 10 matches the reservation ID transmitted from the request terminal 10aa ("YES" at S36-7), the operation proceeds to S36-10. At S36-10, the conference data generator 64 determines that the specific operation state of the participating terminal 10 is "meeting". Matching of the reservation IDs indicates that the reserved conference that the terminal 10aa requests for further information, and the reserved conference that the participating terminal 10 is currently participating in are the same. In such case, the participating terminal 10 has the specific operation state "meeting" to indicate that the participating terminal 10 is currently participating in the reserved conference.

When it is determined that the reservation ID associated with the participating terminal 10 does not match the reservation ID transmitted from the request terminal 10aa ("NO" at S36-7), the operation proceeds to S36-11. At S36-11, the conference data generator 64 determines that the specific operation state of the participating terminal 10 is "busy". When the reserved conference that the terminal 10aa requests for further information is different from the reserved conference that the participating terminal 10 is currently participating in, the conference data generator 64 determines that the participating terminal 10 may be participating in a conference other than the reserved conference specified by the terminal 10aa.

Through performing S36-2 to any one of S36-8 to 11 for each one of the participating terminals 10 that are extracted at S36-1, the management system 50 determines the specific operation state of the participating terminal 10.

At S36-12, the reservation extractor 61 of the management system 50 searches the reservation management table of FIG. 13 using the reservation ID "rsv02" that is included in the conference data request transmitted from the terminal 10aa as a search key to obtain additional information regarding the reserved conference, such as the start date/time, the end date/time, and the conference name.

At S36-13, the conference data generator 64 generates the conference data including the start date/time, the end date/time, the conference name, and the specific operation state of each participating terminal, based on the obtained information. For example, the conference data generator 64 generates the conference data in a data structure as illustrated in FIG. 18, which stores the start date/time, the end date/time, the conference name, the terminal ID of the participating terminal 10, the specific operation state of the participating terminal 10, and the terminal name of the participating terminal, in association with the reservation ID of the reserved conference. The operation then proceeds to S37 of FIG. 16.

At S37, the data transmitter/receiver 51 of the management system 50 transmits the conference data notification including the conference data that is generated at S36-13, to the terminal 10aa, in response to the conference data request.

At S38, the candidate list generator 20 of the terminal 10aa generates the conference reservation information (or conference reservation data), based on the conference data transmitted from the management system 50 and the candidate list frame data stored in the memory 1000. The display control 16 causes the display 120 to display the conference reservation information, for example, as described above referring to FIG. 7. The conference reservation information reflects the specific operation state of each of the participating terminals 10 that are scheduled to participate in the reserved conference.

The management system 50 may perform S36, S37, and S38 to update the conference reservation information, every time the specific operation state of the participating terminal that is managed using the terminal management table of FIG. 10 changes. More specifically, the management system 50 may update the conference data, and transmit the updated conference data at S37. At S38, the terminal 10aa displays the reservation conference information, based on the updated conference data, onto the display 120aa.

Figure 19:
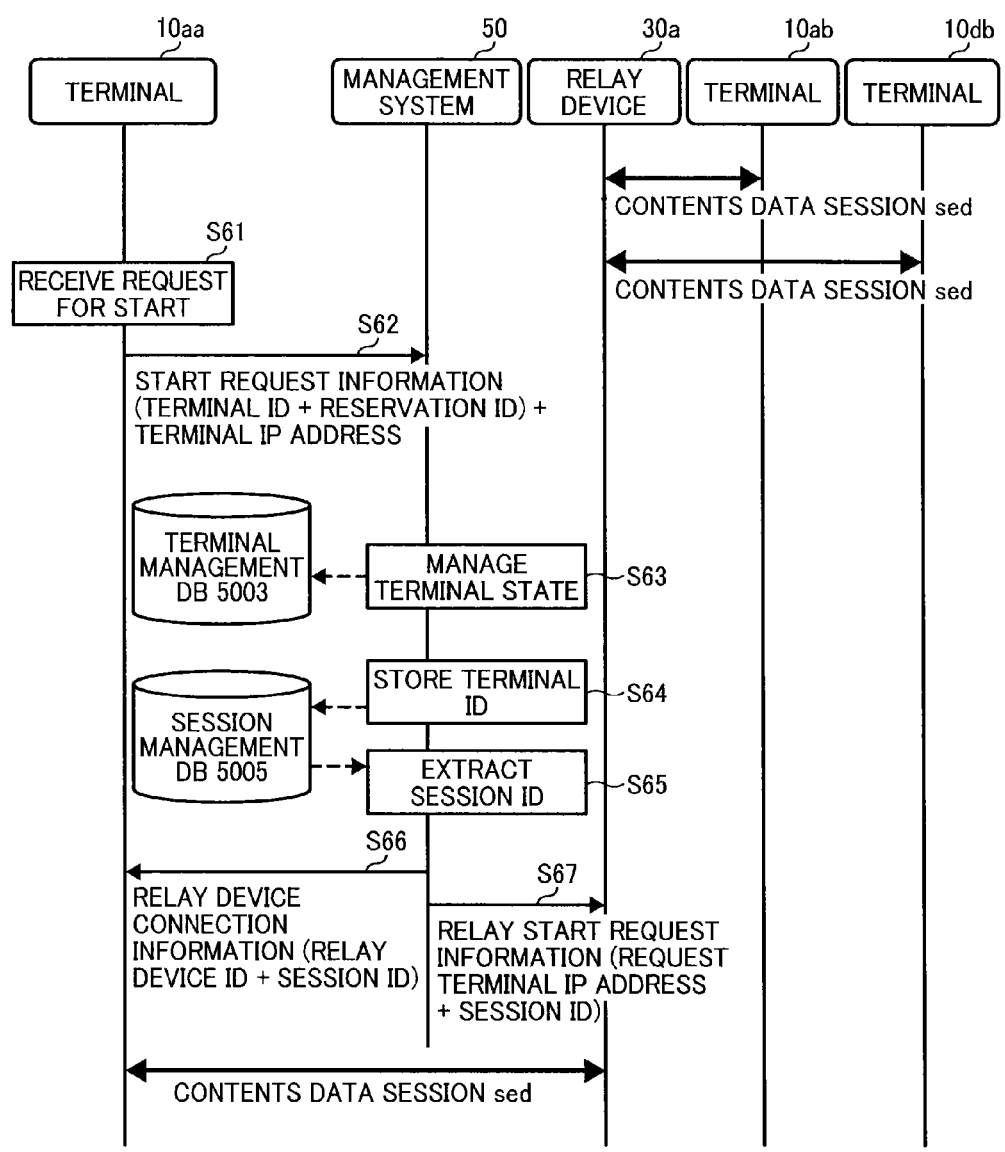
FIG. 19 is a data sequence diagram illustrating operation of processing a request for starting communication with a counterpart terminal that is currently participating in a session, performed by the transmission system of FIG. 1, according to an example embodiment of the present invention.

Referring now to FIG. 19, operation of processing a request for starting communication based on the reserved conference, performed by the transmission system 1 of FIG. 1 in response to the request from the terminal 10aa, is explained according to an example embodiment of the present invention. In FIG. 19, various management data is transmitted or received through the management data session "sei". Further, in this example, before the terminal 10aa starts communication based on the reserved conference, it is assumed that the terminal 10ab and the terminal 10db have established a contents data session "sed" to transmit or receive contents data through the relay device 30a, to carry out communication based on the reserved conference. More specifically, in one example, the operation of FIG. 19 is assumed to be performed after operation of FIG. 16.

At S61, as the user at the request terminal 10aa selects the "Enter" key 312 of the conference reservation information screen of FIG. 7, the operation input 12 (FIG. 6) of the request terminal 10aa receives a user instruction for starting communication with the participating terminals 10 based on the reserved conference.

At S62, the data transmitter/receiver 11 of the request terminal 10aa transmits communication start request information to the management system 50, which requests for starting communication with the participating terminals 10. In this example, the communication start request information includes the terminal ID "01aa" of the request terminal 10aa, and the reservation ID "rsv02" that identifies the reserved conference specified by the conference reservation information. With this information, the data transmitter/receiver 51 of the management system 50 receives the IP address "1.2.1.4" of the request terminal 10aa.

At S63, the state manager 53 of the management system 50 specifies a record in the terminal management table (FIG. 10) stored in the terminal management DB 5003, which corresponds to the terminal ID "01aa" of the request terminal 10aa that is included in the communication start request information to manage the specified record. More specifically, the state manager 53 changes the operation state of the terminal 10aa to "Communicating".

At S64, the session manager 57b of the management system 50 adds the terminal ID "01aa" of the terminal 10aa, to the "Terminal" field of the record including the reservation ID "rsv02" in the session management table of FIG. 12.

At S65, the session manager 57b searches the session management table of FIG. 12 using the reservation ID "rsv02" that is transmitted from the terminal 10aa as a search key to obtain the session ID "se01" and the relay device ID "111a" that are respectively associated with the reservation ID "rsv02".

In this example, the session ID generator 57a generates the session ID "se01" when any one of the terminal 10ab or the terminal 10db firstly starts communication based on the reserved conference. The generated session ID "se01" is stored in the session management table of FIG. 12, for example, by the session manager 57b.

The relay device selector 56 selects one of the relay devices 30a to 30d, when any one of the terminals 10ab or 10db firstly starts communication based on the reserved conference. In this example, the relay device selector 56 selects the relay device 30a having the relay device ID "111a". The session manager 57b stores the relay device ID "111a" of the relay device 30a in the session management table of FIG. 12, in association with the session ID "se01".

The reservation ID "rsv02" is stored in the session management table by the session manager 57b, when any one of the terminals 10ab or 10db firstly starts communication based on the reserved conference specified by the reservation ID "rsv02".

At S66, the data transmitter/receiver 51 of the management system 50 transmits the session ID "se01" extracted at S65, and relay device connection information to be used for connecting the relay device 30a, to the terminal 10aa through the communication network 2. The relay device connection information includes, for example, the relay device ID, the IP address of the relay device 30a, authentication information, and/or a port number. The request terminal 10aa connects with the relay device 30a using the received relay device connection information, to transmit the contents data.

At S67, the data transmitter/receiver 51 of the management system 50 transmits the relay start request information that requests for starting relay for the request terminal 10aa, to the relay device 30a. The relay start request information includes the IP address "01aa" of the request terminal 10aa that request for participating in the contents data session "sed", and the session ID "se01" extracted at S65. The memory control 39 of the relay device 30a stores the IP address of the request terminal 10aa, which now participates in the contents data session "sed" identified by the session ID "se01" in the memory 3000. The relay unit 32 relays contents data transmitted from the terminal 10aa to the terminals 10ab and 10db using the IP addresses of the terminals 10ab and 10db stored in the memory 3000, through the data transmitter/receiver 31. The relay unit 32 further relays contents data transmitted from one of the terminal 10ab or 10db to the terminal 10aa, and the other one of the terminal 10ab or 10db to the terminal 10aa. More specifically, the contents data session "sed" is established among the terminals 10aa, 10ab, and 10db to exchange contents data such that communication based on the reserved conference is carried out among the terminals 10aa, 10ab, and 10db.

Figure 20:
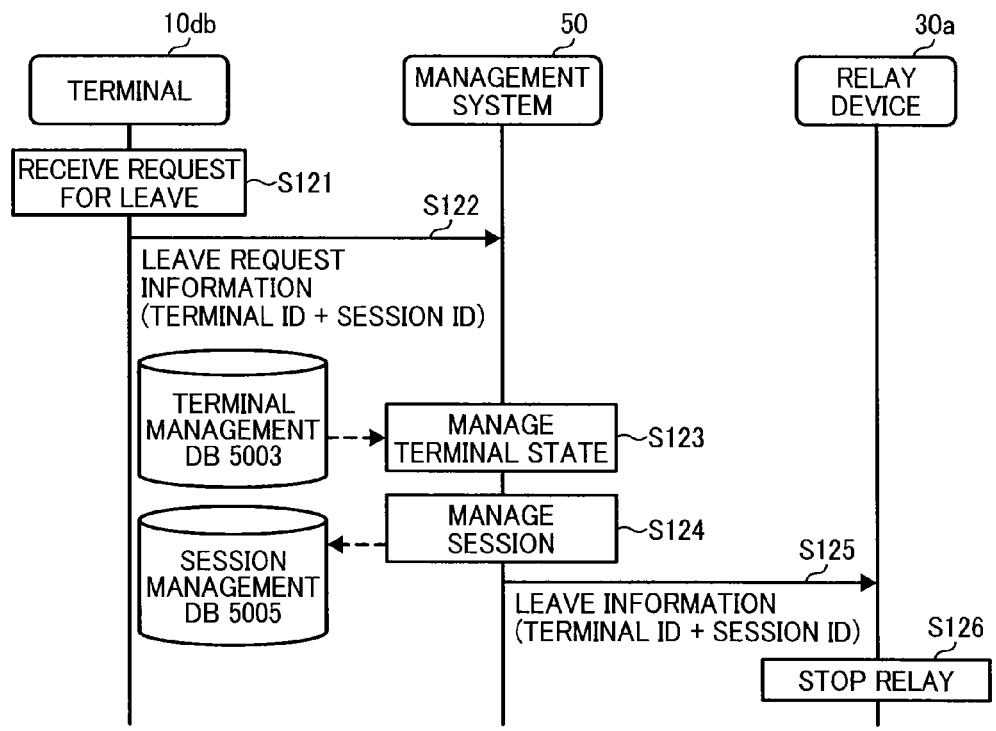
FIG. 20 is a data sequence diagram illustrating operation of processing a request for ending communication with a counterpart terminal, performed by the transmission system of FIG. 1, according to an example embodiment of the present invention.

Referring now to FIG. 20, operation of processing a request for leaving from the contents data session "sed" received from the request terminal 10db, performed by the transmission system 1 of FIG. 1, is explained according to an example embodiment of the present invention. In this example, it is assumed that the request terminal 10db requests to leave from the contents data session "sed" after the contents data session "sed" is established among the terminals 10aa, 10ab, and 10db, to end the conference. In this example illustrated in FIG. 20, various management data is transmitted or received through the management data session "sei".

At S121, as the user at the request terminal 10db presses the operation button 108 (FIG. 4), the operation input 12 (FIG. 6) of the request terminal 10db receives a user instruction for ending communication with the counterpart terminals 10aa and 10ab. The data transmitter/receiver 11 of the request terminal 10db transmits the leave request information to the management system 50. The leave request information includes the terminal ID "01db" of the request terminal 10db, and the session ID "se01" identifying the contents data session "sed" from which the terminal 10db wants to leave.

At S123, the state manager 53 of the management system 50 specifies a record in the terminal management table (FIG. 10) stored in the terminal management DB 5003, which corresponds to the terminal ID "01db" of the request terminal 10db that is included in the leave request information to manage the specified record. More specifically, the state manager 53 changes the operation state of the terminal 10db from "Communicating" to "Online".

At S124, the session manager 57b of the management system 50 refers to the session management table (FIG. 12) stored in the session management DB 5005 to delete the terminal ID "01db" of the request terminal 10db, from the "Terminal ID" data field of the record associated with the session ID "se01".

At S125, the data transmitter/receiver 51 of the management system 50 transmits the leave information including the IP address of the request terminal 10db and the session ID "se01" to the relay device 30a.

At S126, the memory control 39 of the relay device 30a deletes the IP address of the terminal 10db, which is stored in the memory 3000 in association with the received session ID "se01". With this deletion, the relay unit 32 stops relaying contents data, which may be received from the terminal 10db, to the terminals 10ab and 10aa, through the data transmitter/receiver 31. The relay unit 32 further stops relaying contents data, which may be received from the terminal 10ab or 10aa, to the terminal 10db, through the data transmitter/receiver 31.

Through operation of FIG. 20, the terminal 10db leaves from the contents data session "sed" to end communication with the terminals 10aa and 10db.

In the above-described example, the management system 50 manages the terminal ID of the participating terminal 10 that is currently communicating based on the reserved conference, using the session management table (FIG. 12). Based on the terminal ID, the conference data generator 64 generates conference data, which includes information indicating that the participating terminal 10 is currently communicating based on the reserved conference, that is, the participating terminal 10 has the specific operation state "meeting". Based on the conference data received from the management system 50, the user at the terminal 10 is able to know whether the counterpart participating terminal 10 is communicating based on the reserved conference. This eliminates a need for checking whether the counterpart participating terminal 10 is communicating based on the reserved conference.

In another example, the management system 50 manages, for each of the reserved communications to be performed, the terminal ID for identifying the participating terminal 10 that is currently communicating based on the reservation specified by the reservation ID. The conference data generator 64 generates the conference data for each of the reserved communications to be performed. Even when there is more than one reserved communication to be performed, the management system 50 is able to generate the conference data for each of the reserved communications, which includes information regarding the operation state of the participating terminal such as to indicate whether the participating terminal is in the meeting state.

The management system 50 manages the operation state of the terminal 10 in association with the terminal ID of the terminal 10, using the terminal management table. The state extractor 55 obtains the operation state of the terminal 10, from the terminal management table. The data transmitter/receiver 51 transmits the conference data, which is generated based on the operation state of the terminal 10, to the terminal 10 that may start communication based on the reservation, for example, as described above referring to S37 of FIG. 16. The user at the terminal 10, which receives the conference data, is able to know the operation state of the participating terminal 10 that is scheduled to communicate based on the reservation. This information may be used to determine when to start communication based on the reservation.

When the start request information that requests for communication based on the reservation is received, for example, at S62 of FIG. 19, the state manager 53 of the management system 50 changes the operation state of the request terminal 10, which may be managed using the terminal management table of FIG. 10, to the operation state "communicating" (S63 of FIG. 19). For example, the state manager 53 specifies the "operation state" data field in a record including the terminal ID of the request terminal 10, and changes the operation state to the communicating state. Based on information stored in the terminal management table of FIG. 10, the management system 50 is able to obtain the terminal ID of the terminal 10 that starts participating in a contents data session to be stored in the session management table.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Further, the relay device 30, the management system 50, the program providing system 90, and the maintenance system 100 may be each implemented by a single computer. Alternatively, any number of parts, functions, or modules of the relay device 30, the management system 50, the program providing system 90, and the maintenance system 100 may be classified into a desired number of groups to be carried out by a plurality of computers. In case the program providing system 90 is implemented by the single computer, the program to be provided by the program providing system 90 may be transmitted, one module by one module, after dividing into a plurality of modules, or may be transmitted at once. In case the program providing system 90 is implemented as a plurality of computers, each computer may transmit each module that is stored in its memory, after the program is divided into a plurality of modules.

A recording medium storing any one of the terminal control program, relay device control program, and transmission management program, or a storage device such as the HDD 204 that stores any one of the terminal control program, relay device control program, and transmission management program, or the program providing system 90 provided with the HD 204 storing any one of the terminal control program, relay device control program, and transmission management program, may be distributed within the country or to another country as a computer program product.

Further, in the above-described examples, the relay device IP address of the relay device 30 and the terminal IP address of the terminal 10 are respectively managed using the relay device management table of FIG. 8 and the terminal management table of FIG. 10. Alternatively, the relay device 30 and the terminal 10 may each be managed using any other identification information or using any other tables. For example, when the relay device 30 or the terminal 10 needs to be identified on the communication network 2, the relay device 30 or the terminal 10 may be managed using Fully Qualified Domain Name (FQDN). In such case, the transmission system 1 is provided with a domain name system (DNS) server that obtains the IP address that corresponds to the FQDN of the relay device 30 or the terminal 10. In view of this, identification information for identifying the relay device 30 on the communication network 2 may not only include the identification information that identifies the relay device 30 on the communication network 2, but also identification information that identifies a node on the communication network 2 to which the relay device 30 is connected, or identification information that identifies a node on the communication network 2 from which the relay device 30 is connected. Similarly, identification information for identifying the terminal 10 on the communication network 2 may not only include the identification information that identifies the terminal 10 on the communication network 2, but also identification information that identifies a node on the communication network 2 to which the terminal 10 is connected, or identification information that identifies a node on the communication network 2 from which the terminal 10 is connected.

In the above-described examples, the transmission system 1 of FIG. 1 is treated as a videoconference system. Alternatively, the transmission system 1 of FIG. 1 may be implemented as a teleconference system such as the IP teleconference system or the Internet teleconference system. Alternatively, the transmission system 1 of FIG. 1 may be implemented as a car navigation system. For example, the request terminal 10 may be implemented as a car navigation system that is installed onto an automobile. The counterpart terminal 10 may be implemented as a management terminal or server at a management center that manages the car navigation system or a car navigation system that is installed onto another automobile. Alternatively, the transmission system 1 may be implemented as a screen sharing system.

Figure 21:
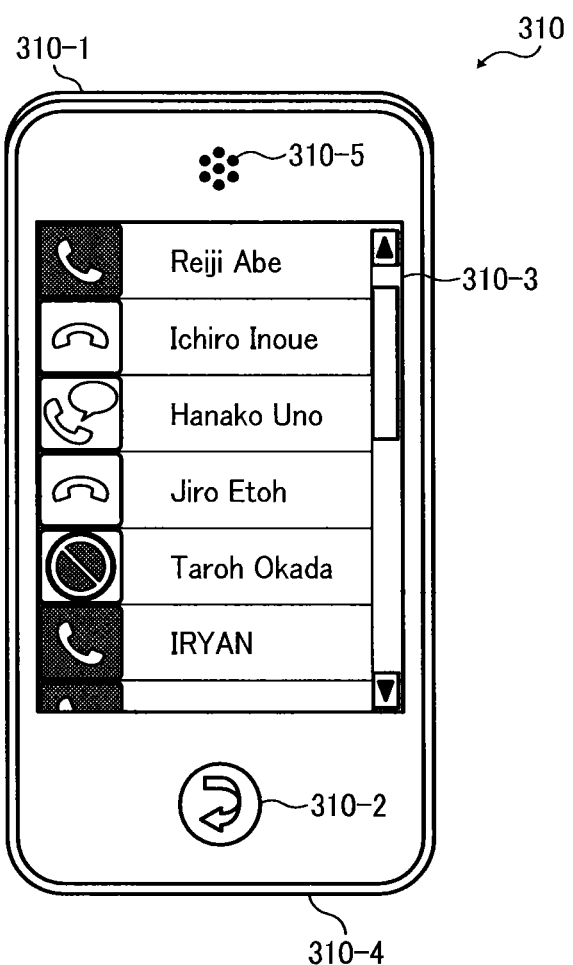
FIG. 21 is an illustration for explaining candidate information, according to an example embodiment of the present invention.

In another example, the transmission system 1 of FIG. 1 may be implemented as a communication system having a portable phone. In such case, the terminal 10 is implemented as the portable phone. For example, as illustrated in FIG. 21, the terminal 10, or the portable phone 310, includes a body 310-1, a menu screen display button 310-2, a display section 310-3, a microphone 310-4 provided at a lower portion of the body, and a speaker 310-5 provided at an upper portion of the body. When selected, the menu screen display button 310-2 causes the display section 310-3 to display a menu screen in which various icons each indicating a specific application program are displayed. In this example, the display section 310-3 displays a candidate terminal list that lists a plurality of terminal names together with a plurality of icons each reflecting the operation state of each candidate terminal. Since the terminal 10 in this example is implemented as a portable phone 310, the name of a user who owns the specific terminal, or a nickname of the user, is displayed as the terminal name.

The display section 310-3 is a touch panel screen, which allows the user to select one of the plurality of terminal names being displayed by the display section 310-3. When a specific terminal name, or a user name, is selected, the portable phone 310 starts communication with the specific terminal that is selected in a substantially similar manner as described above.

Further, in the above-described examples, the transmission system 1 is implemented as a videoconference system for use at offices. Other examples of use of the transmission system 1 include, but not limited to, meetings, casual conversation among family members or friends, and distribution of information in one direction.

Further, any of the above-described devices or units can be implemented as a hardware apparatus, such as a special-purpose circuit or device, or as a hardware/software combination, such as a processor executing a software program.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cashe memory of the CPU, and the RAM may function as a physical memory or a primary memory of the apparatus, while the HDD may function as a secondary memory of the apparatus.

In one example, the present invention may reside in a transmission management system, which may be implemented by one or more apparatuses. The transmission management system includes a communication manager to store terminal identification information for identifying a transmission terminal that is currently participating in a session based on reservation of communication; a generator to generate reservation communication information based on the terminal identification information, which at least indicates whether a counterpart transmission terminal that is scheduled to participate in the session based on the reservation of communication is currently participating in the session based on the reservation of communication; and a transmitter to transmit the reservation communication information to a request transmission terminal that may request to start communication with the counterpart transmission terminal based on the reservation of communication.

For example, the communication manager may correspond to the session manager 57b, which may be implemented by one or more processors such as the instructions of the CPU or one or more processing circuits. The generator may correspond to the conference data generator 64, which may be implemented by one or more processors such as the instructions of the CPU or one or more processing circuits. The transmitter may correspond to the data transmitter/receiver 51, which may be implemented by a network interface. Further, the transmission terminal may be any number of transmission terminals, and the counterpart transmission terminal may be any number of counterpart transmission terminals.

In case a user at the request transmission terminal wants to start communication based on the reservation of communication, if any user at a counterpart transmission terminal that is scheduled to participate in a session based on the reservation of communication, is communicating, the user at the request transmission terminal is not able to know whether the counterpart transmission terminal is communicating based on the reservation of communication. Even in such case, according to one aspect of the present invention, the user at the request transmission terminal is notified of the specific operation state of the counterpart transmission terminal, which indicates whether the counterpart transmission terminal is participating in the session based on the reservation of communication.

More specifically, in one example, the session manager 57b of the management system 50 stores terminal identification information for identifying each one of a plurality of transmission terminals that are participating in a session based on reservation of communication, for example, in a session management DB 5005. Based on the terminal identification information such as the terminal IDs of the transmission terminals, the conference data generator 64 generates reservation communication information indicating whether any one of the plurality of transmission terminals 10 that are scheduled to participate in the session, is currently participating in the session based on the reservation of communication. Based on the reservation communication information transmitted from the management system 50, the user at the request transmission terminal 10 is able to know whether any one of the counterpart transmission terminals 10 is communicating based on the reservation of communication.

Further, in one example, the transmission management system stores, for each of reservations of communication to be performed, terminal identification information. The generator generates, for each of the reservations of communication, reservation communication information. For example, the communication manager stores, for each one of one or more sessions, terminal identification information for identifying a transmission terminal that is currently participating in a session, in association with reservation identification information for identifying reservation of communication on which the session is based. The generator generates the reservation communication information for at least one of the reservations of communication identified by reservation identification information associated with the request transmission terminal.

For example, the transmission management system 50 obtains reservation identification information for identifying reservation of communication, from a request transmitted from the request transmission terminal 10. The session manager 57b obtains a plurality of terminal IDs of a plurality of transmission terminals that are stored in association with the reservation identification information obtained from the request transmission terminal 10.

In one example, the transmission management system further includes a state manager to store terminal state information indicating an operation state of the counterpart transmission terminal. The generator generates the reservation communication information based on the terminal state information.

For example, the state manager may correspond to the state manager 53, which manages the operation state of each one of a plurality of transmission terminals. The state manager may be implemented by one or more processors such as the instructions of the CPU or one or more processing circuits. In one example, the state manager 53 changes the operation state of the counterpart transmission terminal to indicate that the counterpart transmission terminal is communicating, in response to a request for participating in the session from the counterpart transmission terminal. The conference data generator 64 generates the reservation communication information indicating that the counterpart transmission terminal is currently participating in the session based on the reservation of communication, based on the terminal state information indicating that the counterpart transmission terminal is communicating.

In some cases, however, the counterpart transmission terminal having the terminal state information "communicating" may not be participating in the session based on the reservation of communication. In view of this, the conference data generator 64 further obtains reservation identification information associated with the terminal identification information of the counterpart transmission terminal having the terminal state information "communicating", determines whether the reservation identification information of the counterpart transmission terminal matches the reservation identification information obtained from the request transmission terminal to generate a determination result, and generates the reservation communication information based on the determination result. The reservation communication information indicates that the counterpart transmission terminal is communicating based on the reservation of communication when the determination result indicates that the reservation identification information of the counterpart transmission terminal matches the reservation identification information of the request transmission terminal. The reservation communication information indicates that the counterpart transmission terminal is communicating not based on the reservation of communication when the determination result indicates that the reservation identification information of the counterpart transmission terminal does not match the reservation identification information of the request transmission terminal.

In one example, the present invention may reside in a transmission system including any one of the above-described transmission management systems and at least one transmission terminal. For example, the request transmission terminal displays information based on the reservation communication information received from the transmission management system. The request transmission terminal may display information on any desired display.

In one example, the present invention may reside in a non-transitory recording medium storing a plurality of instructions which, when executed by a processor, cause the processor to perform a method of generating reservation communication information based on terminal identification information for identifying each one of a plurality of transmission terminals that are currently participating in a session based on reservation of communication.

In one example, the present invention may reside in a method of obtaining reservation communication information including: transmitting a request for obtaining reservation communication information to a transmission management system; and displaying information based on the reservation communication information received from the transmission management system. The reservation communication information, which is generated based on terminal identification information for identifying a transmission terminal that is currently participating in a session based on reservation of communication, at least indicates whether a counterpart transmission terminal that is scheduled to participate in the session based on the reservation of communication is currently participating in the session based on the reservation of communication.

For example, the present invention may reside in a method of obtaining reservation communication information, including: transmitting a request for obtaining reservation communication information regarding a session based on reservation of communication, wherein the request causes a transmission management system to generate reservation communication information based on terminal identification information for identifying a transmission terminal that is currently participating in a session based on reservation of communication, the reservation communication information at least indicating whether a counterpart transmission terminal that is scheduled to participate in the session based on the reservation of communication is currently participating in the session based on the reservation of communication; and displaying information based on the reservation communication information at a request transmission terminal that may request to start communication with the counterpart transmission terminal based on the reservation of communication.

What is claimed is:

1. A transmission management apparatus, comprising:
    a first memory configured to store terminal identification information for identifying a transmission terminal that is currently participating in a session based on a reservation;
    processing circuitry configured to generate reservation communication information based on the terminal identification information, the reservation communication information at least indicating whether a counterpart transmission terminal that is scheduled to participate in the session based on the reservation is currently participating in the session based on the reservation; and
    a transmitter configured to transmit the reservation communication information to a request transmission terminal that requests to start communication with the counterpart transmission terminal based on the reservation,
    wherein the processing circuitry is further configured to obtain first reservation identification information of the counterpart transmission terminal and second reservation identification information of the request transmission terminal, and generate the reservation communication information by comparing the first and second reservation identification information.

2. The transmission management apparatus of claim 1, wherein
    the first memory is configured to store, for each one of one or more sessions, terminal identification information for identifying a transmission terminal that is currently participating in a session, in association with reservation identification information for identifying a reservation on which the session is based, and
    the processing circuitry generates the reservation communication information for at least one of the reservations identified by reservation identification information associated with the request transmission terminal.

3. The transmission management apparatus of claim 2, further comprising:
a receiver to receive the second reservation identification information from the request transmission terminal.

4. The transmission management apparatus of claim 3, further comprising:
a second memory to store terminal state information indicating an operation state of the counterpart transmission terminal that is scheduled to participate in the session,
wherein the processing circuitry is configured to generate the reservation communication information indicating that the counterpart transmission terminal is currently participating in the session based on the reservation, based on the terminal state information indicating that the counterpart transmission terminal is communicating.

5. The transmission management apparatus of claim 4, wherein the processing circuitry is further configured to:
obtain the first reservation identification information associated with the terminal identification information of the counterpart transmission terminal having the terminal state information indicating that the counterpart transmission terminal is communicating;
determine whether the first reservation identification information of the counterpart transmission terminal matches the second reservation identification information obtained from the request transmission terminal to generate a determination result; and
generate the reservation communication information based on the determination result such that,
the reservation communication information indicates that the counterpart transmission terminal is communicating based on the reservation when the determination result indicates that the reservation identification information of the counterpart transmission terminal matches the reservation identification information of the request transmission terminal, and
the reservation communication information indicates that the counterpart transmission terminal is communicating not based on the reservation when the determination result indicates that the reservation identification information of the counterpart transmission terminal does not match the reservation identification information of the request transmission terminal.

6. A transmission system, comprising:
the transmission management apparatus of claim 1; and
the request transmission terminal configured to display information based on the reservation communication information.

7. The transmission system of claim 6, wherein the information based on the reservation communication information is displayed in a graphical form.

8. A transmission management system, comprising:
one or more processors configured to store terminal identification information for identifying a transmission terminal that is currently participating in a session based on a reservation, and generate reservation communication information based on the terminal identification information, the reservation communication information at least indicating whether a counterpart transmission terminal that is scheduled to participate in the session based on the reservation is currently participating in the session based on the reservation; and
a network interface configured to transmit the reservation communication information to a request transmission terminal that requests to start communication with the counterpart transmission terminal based on the reservation,
wherein the one or more processors are further configured to obtain first reservation identification information of the counterpart transmission terminal and second reservation identification information of the request transmission terminal, and generate the reservation communication information by comparing the first and second reservation identification information.

9. The transmission management system of claim 8, wherein the one or more processors are configured to
store, for each one of one or more sessions, terminal identification information for identifying a transmission terminal that is currently participating in a session, in association with reservation identification information for identifying a reservation on which the session is based, and
generate the reservation communication information for at least one of the reservations identified by reservation identification information associated with the request transmission terminal.

10. The transmission management system of claim 9, wherein the network interface is configured to receive the second reservation identification information from the request transmission terminal.

11. The transmission management system of claim 10, wherein the one or more processors are configured to
store terminal state information indicating an operation state of the counterpart transmission terminal that is scheduled to participate in the session, and
generate the reservation communication information indicating that the counterpart transmission terminal is currently participating in the session based on the reservation, based on the terminal state information indicating that the counterpart transmission terminal is communicating.

12. The transmission management system of claim 11, wherein the one or more processors are further configured to:
obtain the first reservation identification information associated with the terminal identification information of the counterpart transmission terminal having the terminal state information indicating that the counterpart transmission terminal is communicating;
determine whether the first reservation identification information of the counterpart transmission terminal matches the second reservation identification information obtained from the request transmission terminal to generate a determination result; and
generate the reservation communication information based on the determination result such that,
the reservation communication information indicates that the counterpart transmission terminal is communicating based on the reservation when the determination result indicates that the reservation identification information of the counterpart transmission terminal matches the reservation identification information of the request transmission terminal, and
the reservation communication information indicates that the counterpart transmission terminal is communicating not based on the reservation when the determination result indicates that the reservation identification information of the counterpart transmission terminal does not match the reservation identification information of the request transmission terminal.

13. A non-transitory recording medium storing a plurality of instructions which, when executed by a processor, cause the processor to perform a method of generating reservation communication information, the method comprising:
  storing terminal identification information for identifying a transmission terminal that is currently participating in a session based on a reservation;
  generating the reservation communication information based on the terminal identification information, the reservation communication information at least indicating whether a counterpart transmission terminal that is scheduled to participate in the session based on the reservation is currently participating in the session based on the reservation; and
  transmitting the reservation communication information to a request transmission terminal that requests to start communication with the counterpart transmission terminal based on the reservation,
  wherein the generating step comprises obtaining first reservation identification information of the counterpart transmission terminal and second reservation identification information of the request transmission terminal, and generating the reservation communication information by comparing the first and second reservation identification information.

* * * * *